(12) United States Patent
Ogawa

(10) Patent No.: US 8,982,822 B2
(45) Date of Patent: Mar. 17, 2015

(54) TRANSMITTER, RECEIVER, COMMUNICATION SYSTEM, AND COMMUNICATION METHOD

(71) Applicant: Fujitsu Limited, Kawasaki-shi, Kanagawa (JP)

(72) Inventor: Daisuke Ogawa, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 13/670,027

(22) Filed: Nov. 6, 2012

(65) Prior Publication Data

US 2013/0064203 A1 Mar. 14, 2013

Related U.S. Application Data

(63) Continuation of application No. PCT/JP2010/003450, filed on May 21, 2010.

(51) Int. Cl.
*H04W 4/00* (2009.01)
*H04L 5/00* (2006.01)

(52) U.S. Cl.
CPC .................. *H04L 5/0048* (2013.01)
USPC ......................................... 370/329

(58) Field of Classification Search
USPC ........... 370/328, 329, 330, 35, 342, 343, 344, 370/345, 477, 478, 480, 482, 203
See application file for complete search history.

(56) References Cited

U.S. PATENT DOCUMENTS

2006/0028976 A1* 2/2006 Park et al. ............. 370/203
2009/0257517 A1* 10/2009 Nordstrom et al. ........ 375/260
2009/0316659 A1* 12/2009 Lindoff et al. ............... 370/332
2011/0261771 A1 10/2011 Nagata et al.
2011/0280189 A1 11/2011 Tsuboi et al.

FOREIGN PATENT DOCUMENTS

WO WO 2009152657 A1 * 12/2009 ............ H04W 72/04
WO 2010/053054 5/2010
WO 2010/087214 8/2010

OTHER PUBLICATIONS

Notice of Reasons for Rejection issued for corresponding Japanese Patent Application No. 2012-515648, mailed May 28, 2013, with partial English translation.

(Continued)

*Primary Examiner* — Edan Orgad
*Assistant Examiner* — Saumit Shah
(74) *Attorney, Agent, or Firm* — Myers Wolin, LLC

(57) ABSTRACT

A communication system, etc. are provided that can prevent the accuracy of propagation channel estimation from degrading when performing radio communications based on orthogonal frequency division multiplexing (OFDM) by using a plurality of carriers each with a predetermined bandwidth. Radio communications based on an OFDM scheme are performed between a transmitter and a receiver by using a carrier with a prescribed bandwidth in which first signals such as reference signals, for example, are arranged at constant subcarrier intervals. The transmitter, when performing communications with the receiver by using a plurality of such carriers, transmits to the receiver an OFDM signal in which the first signals are arranged at predetermined subcarrier intervals across the plurality of carriers. The receiver extracts the first signals from the OFDM signal received from the transmitter.

9 Claims, 22 Drawing Sheets

(56) References Cited

OTHER PUBLICATIONS

Pantech, "Further Consideration on Carrier Segment", Agenda Item: 7.1.1, Jan. 18-22, 2010, pp. 1-4, 3GPP TSG-RAN1 Meeting #59bis, R1-100662, Valencia, Spain.
International Search Report issued for corresponding International Patent Application No. PCT/JP2010/003450, mailed Aug. 10, 2010.
Pantech, Further Consideration on Carrier Segment, Agenda Item: 7.1.13; GPP TSG-RAN1 Meeting #59bis, Valencia, Spain, Jan. 18-22, 2010; R1-100662.

Ericsson and ST-Ericsson; Contiguous Carrier Aggregation—Overall Proposal; Agenda item: 8.1.3, 3GPP TSG-RAN WG4 Meeting #53; Jeju, Korea, Nov. 9-13, 2009; R4-094504.

3GPP TS 36.211 V9.0.0 (Dec. 2009); 3rd Generation Partnership Project; Technical Specification Group Radio Access Network; Evolved Universal Terrestrial Radio Access (E-UTRA); Physical Channels and Modulation (Release 9); Dated Dec. 2009.

* cited by examiner

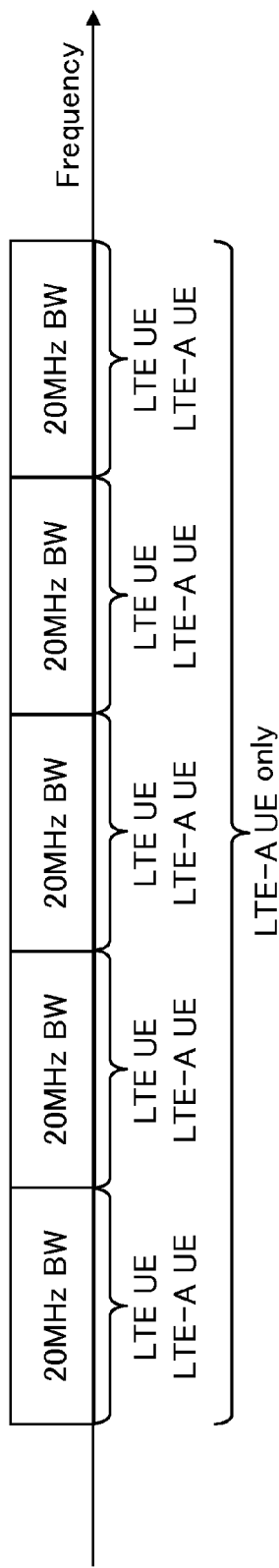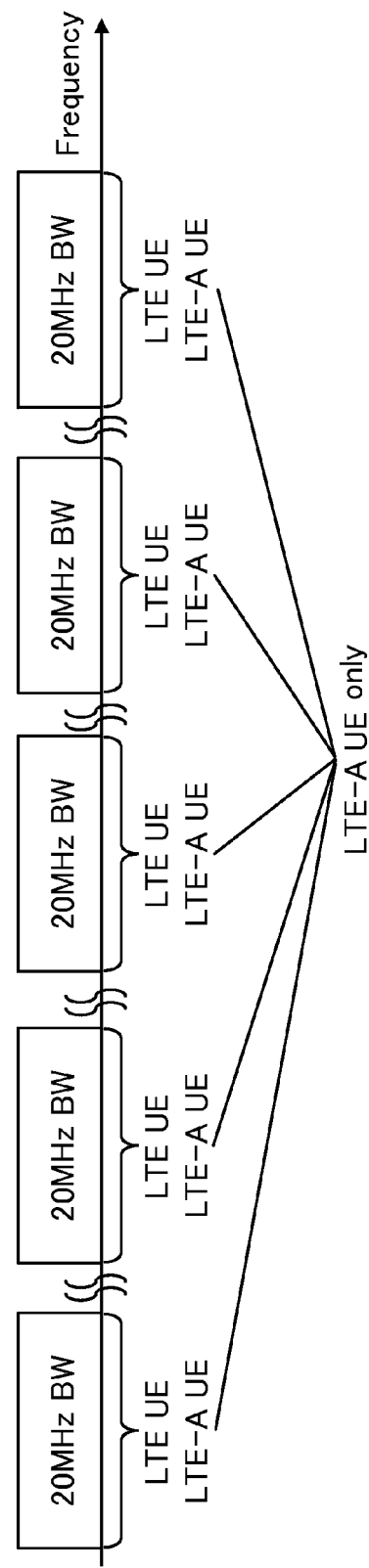

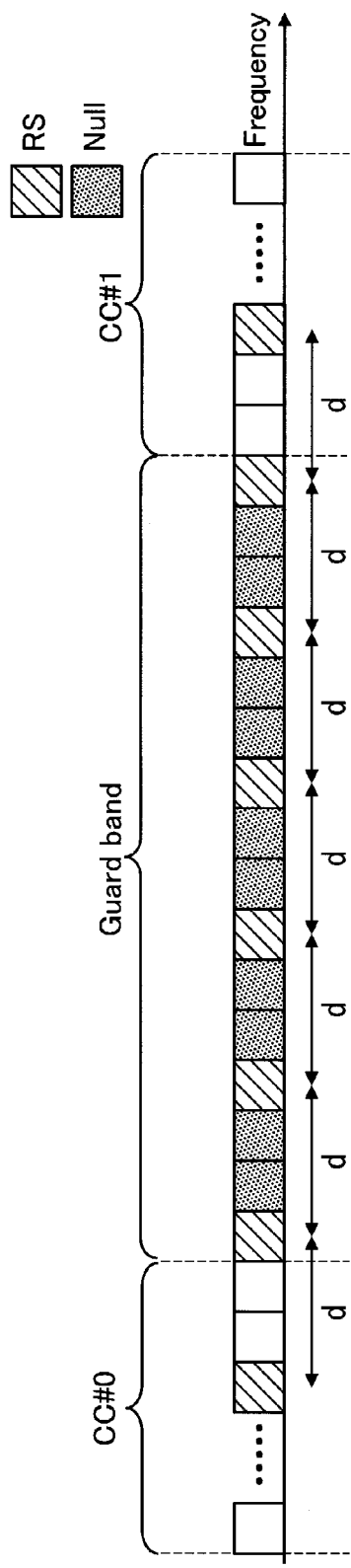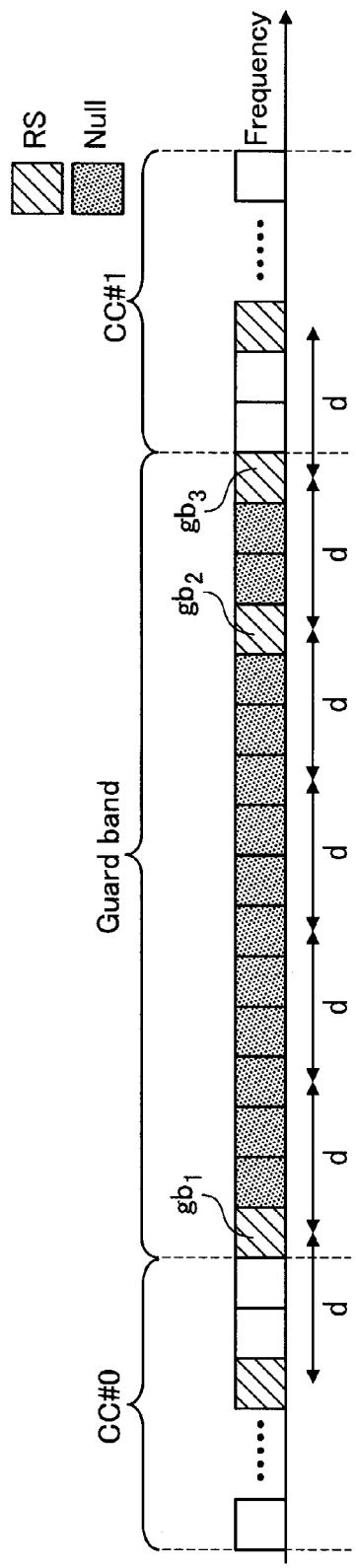

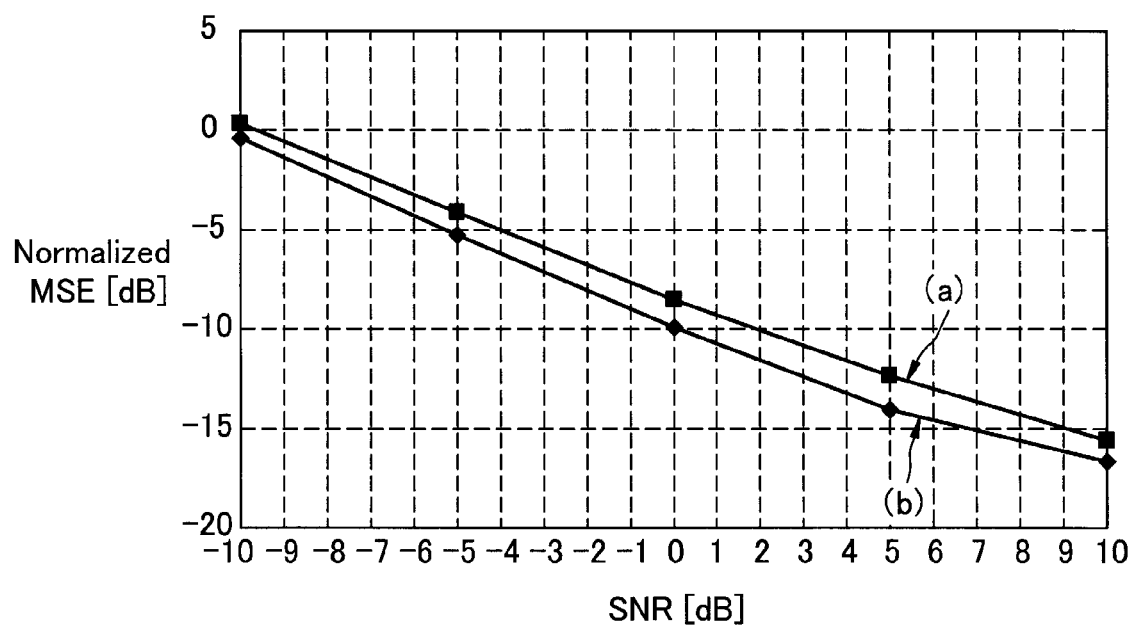
F I G. 22

TRANSMITTER, RECEIVER, COMMUNICATION SYSTEM, AND COMMUNICATION METHOD

CROSS-REFERENCE TO RELATED APPLICATIONS

This application is a continuation application based on International application No. PCT/JP2010/003450, filed on May 21, 2010, the entire contents of which are incorporated herein by reference.

FIELD

The embodiment relates to a technique for arranging known signals, such as reference signals, in an OFDM signal when performing radio communications using OFDM (Orthogonal Frequency Division Multiplexing) between a transmitter and a receiver.

BACKGROUND

In cellular radio communication systems, the changeover from UMTS (Universal Mobile Telecommunication System) to LTE (Long Term Evolution) has been proceeding. In LTE, OFDM (Orthogonal Frequency Division Multiplexing) is adopted as downlink radio access technology that can achieve high efficiency in frequency utilization.

On the other hand, the 3GPP (3rd Generation Partnership Project) that has defined the LTE specification is currently conducting a study on the standardization of LTE-A (LTE Advanced) in order to achieve higher communication speeds for next generation communication systems. The study includes discussions on "carrier aggregation." In carrier aggregation, a plurality of existing LTE carriers (hereinafter called "component carriers" for convenience) are aggregated and the thus aggregated carriers are received. FIGS. 1A and 1B illustrate examples of carrier aggregation currently under study.

FIG. 1A concerns an example of carrier aggregation in which five contiguous LTE carriers (component carriers), each with a 20-MHz bandwidth, are aggregated. Since each 20-MHz component carrier is compatible with LTE, communications with existing LTE users (LTE UEs) can be carried out by using such component carriers. On the other hand, the LTE-A user (LTE-A UE) can perform communications with a bandwidth of up to 100 MHz by using one to five CCs as desired. Aggregation of a plurality of component carriers spaced apart in frequency, such as depicted in the example of carrier aggregation of FIG. 1B, is also being studied.

Generally, in a radio communication system, a pilot signal as a known signal is inserted for transmission between the transmitter and the receiver for such purposes as timing synchronization and propagation channel condition estimation. This pilot signal is called a reference signal (hereinafter abbreviated RS). FIGS. 2A and 2B illustrate how such RSs are arranged on radio resources. In the example depicted in FIGS. 2A and 2B, the RSs are arranged in a scattered manner over two-dimensional radio resources plotted with subcarrier (frequency) as abscissa and OFDM symbol (time) as ordinate. In LTE, the arrangement of RSs is determined by the cell ID assigned, for example, to the radio base station designated as the transmitter. For example, FIG. 2A illustrates the arrangement of RSs when the remainder on dividing the cell ID of the radio base station by 6 is 0 (Cell-ID %6=0), while FIG. 2B illustrates the arrangement of RSs when the remainder on dividing the cell ID of the radio base station by 6 is 2 (Cell-ID %6=2). Further, in LTE, RSs are mapped at intervals of six subcarriers. As illustrated in FIGS. 2A and 2B, the offset from the band end (the leftmost end of the radio resources in FIGS. 1A and 1B) for starting the mapping of the RSs to the radio resources differs according to the remainder left on dividing the cell ID of the radio base station by 6. The arrangement of RSs in LTE described above is disclosed in the 3GPP's technical specification 3GPP TS 36.211.

In LTE, the mobile station as the receiver performs propagation channel estimation by using RSs which are known signals. Various methods are known for propagation channel estimation. As an example, a well known method of propagation channel estimation in time domain will be described below.

First, the mobile station performs pattern cancellation on the RSs inserted in the received OFDM signal and converts it into a signal of a prescribed waveform such as a rectangular wave. Next, an IFFT of length equal to a predetermined number (for example, Nfft) of samples is applied to a predetermined number (for example, Nc) of subcarrier signals in the pattern-canceled signal, after which processing for removing noise components is performed. Finally, an FFT is applied to convert the signal into a frequency-domain signal.

For example, when the offset is 0 (FIG. 2A), in LTE the RSs are arranged at intervals of six subcarriers, as shown in FIG. 3, and only the RSs are extracted from the received OFDM signal at the mobile station. As shown in FIG. 3, when the resource elements, i.e., the subcarriers, in the first OFDM symbol are numbered in sequence starting from the band end, pattern cancellation is performed on the 200 (i.e., the number, Nc, of) RSs mapped to the subcarriers numbered 0, 6, . . . , 1194 out of the 1200 subcarriers, and an IFFT of size Nfft=256 is applied. If the pattern-canceled signal is a rectangular wave, the IFFT output becomes a sin c function. After noise components are removed by equating to zero any portion not larger than a predetermined threshold value, the propagation channel waveform in the time domain of the IFFT output is converted by FFT into the frequency domain. A propagation channel estimate is thus obtained for each subcarrier.

In LTE-A, carrier aggregation is employed, as earlier described, but it is proposed that when aggregating 20-MHz component carriers, 19 null subcarriers (subcarriers not transmitting any signals) be inserted as a guard band between each component carrier. For example, as shown in FIG. 4, two component carriers each with a 20-MHz bandwidth are aggregated in the downlink OFDM signal to be transmitted from the base station eNB to the mobile station UE, and 19 null subcarriers are inserted between the two component carriers. The base station UE receives a signal with an aggregate bandwidth of 40 MHz and applies signal processing to the entirety of the 40-MHz signal at the baseband level.

Related art is disclosed in 3GPP TS 36.211 V9.0.0) (2009-12), 3rd Generation Partnership Project; Technical Specification Group Radio Access Network; Evolved Universal Terrestrial Radio Access (E-UTRA); Physical Channels and Modulation (Release 9), and Contiguous Carrier Aggregation-Overall Proposal.

SUMMARY

According to a first aspect, there is provided a transmitter that performs radio communications with a receiver, based on an OFDM scheme, by using a carrier with a prescribed bandwidth in which first signals known to both the transmitter and the receiver are arranged at constant subcarrier intervals. The transmitter includes: (A) a signal generating unit which, when performing communications with the receiver by using a plurality of the carriers, generates an OFDM signal in which the first signals are arranged at predetermined subcarrier intervals across the plurality of carriers; and (B) a transmitting unit which transmits the OFDM signal to the receiver.

According to a second aspect, there is provided a receiver that performs radio communications with a transmitter, based on an OFDM scheme, by using a carrier with a prescribed bandwidth in which first signals known to both the transmitter and the receiver are arranged at constant subcarrier intervals. The receiver includes: (C) a receiving unit which receives an OFDM signal from the transmitter; and (D) a signal extracting unit which, when performing communications with the transmitter by using a plurality of the carriers, extracts from the OFDM signal the first signals that are arranged at predetermined subcarrier intervals across the plurality of carriers.

According to a third aspect, there is provided a communication system that performs radio communications between a transmitter and a receiver, based on an OFDM scheme, by using a carrier with a prescribed bandwidth in which first signals known to both the transmitter and the receiver are arranged at constant subcarrier intervals.

According to a fourth aspect, there is provided a communication method for use in a communication system that performs radio communications between a transmitter and a receiver, based on an OFDM scheme, by using a carrier with a prescribed bandwidth in which first signals known to both the transmitter and the receiver are arranged at constant subcarrier intervals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 1A and 1B are diagrams illustrating examples of carrier aggregation in which five LTE carriers (component carriers), each with a 20-MHz bandwidth, are aggregated in a communication system according to the prior art.

FIGS. 19A and 19B are diagram illustrating the radio resource state when two component carriers are aggregated according to a fifth embodiment.

FIG. 22 is a diagram illustrating the results of simulation with normalized MSE as a function of received SNR in order to verify the effect of the embodiment.

DESCRIPTION OF EMBODIMENTS

When subcarriers are inserted between component carriers, the number of subcarriers at which intervals the RSs are arranged (six subcarriers in LTE) becomes different between the contiguous component carrier, and this can lead to the problem that the accuracy of propagation channel estimation degrades. This problem will be described below.

Figure 3:
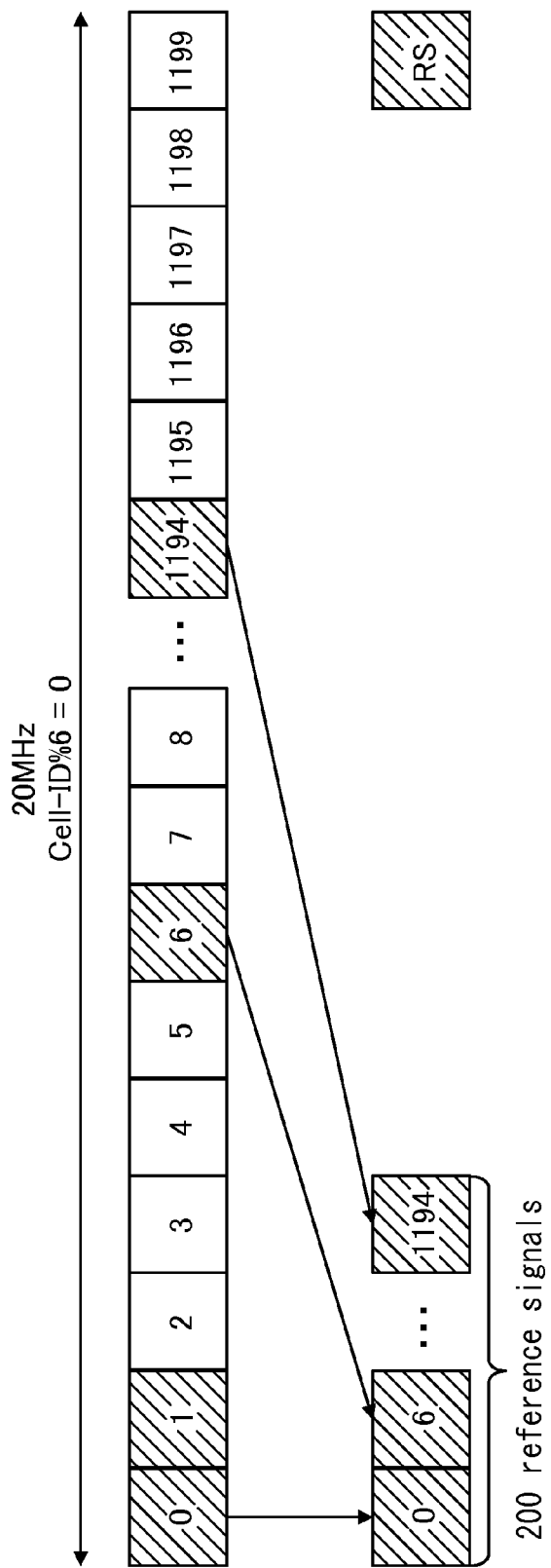
FIG. 3 is a diagram for explaining how RSs arranged at intervals of six subcarriers on radio resources are extracted in a communication system according to the prior art.
Figure 4:
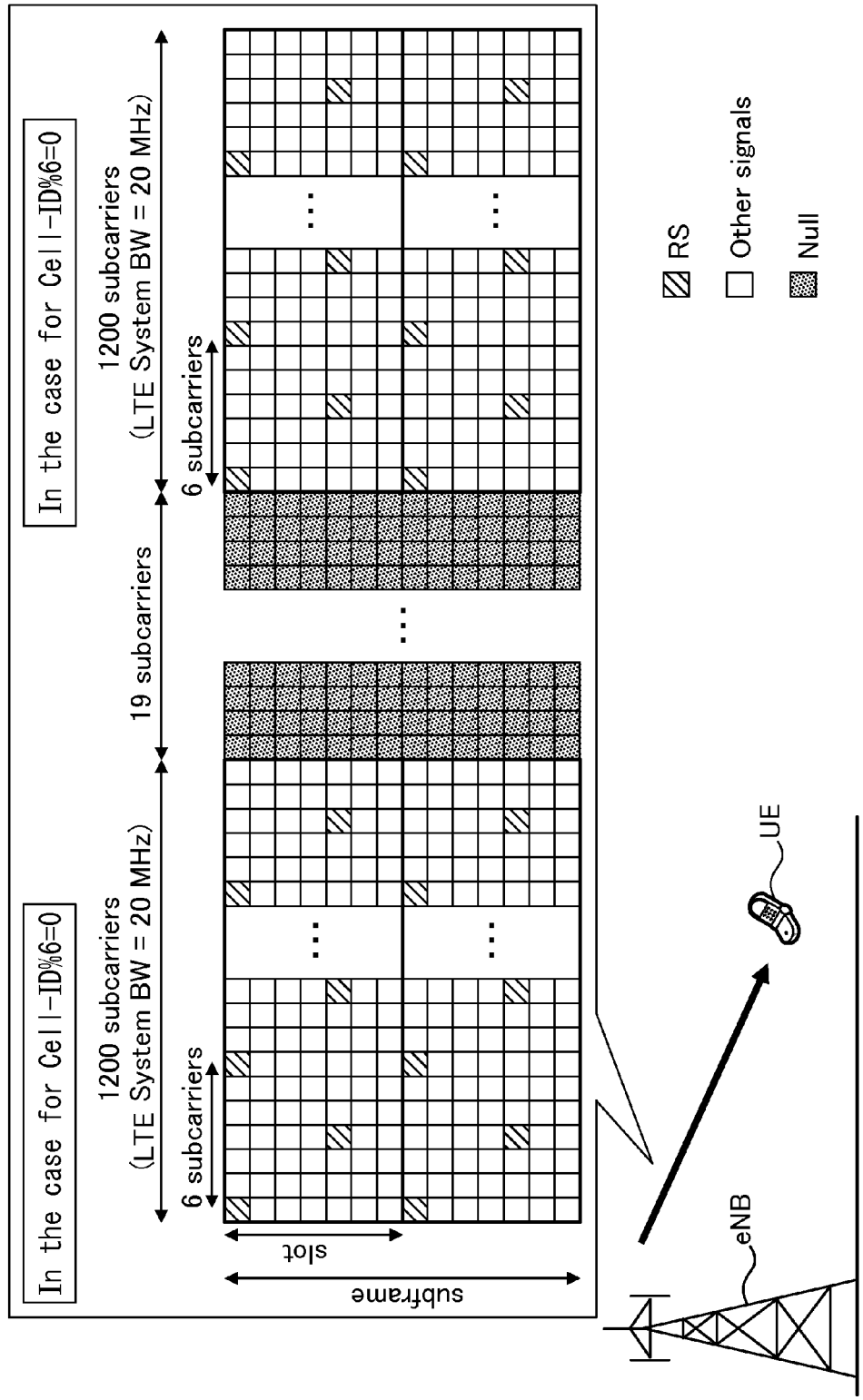
FIG. 4 is a diagram illustrating an example in which carrier aggregation using two contiguous component carriers is applied to a downlink signal in a communication system according to the prior art.
Figure 5:
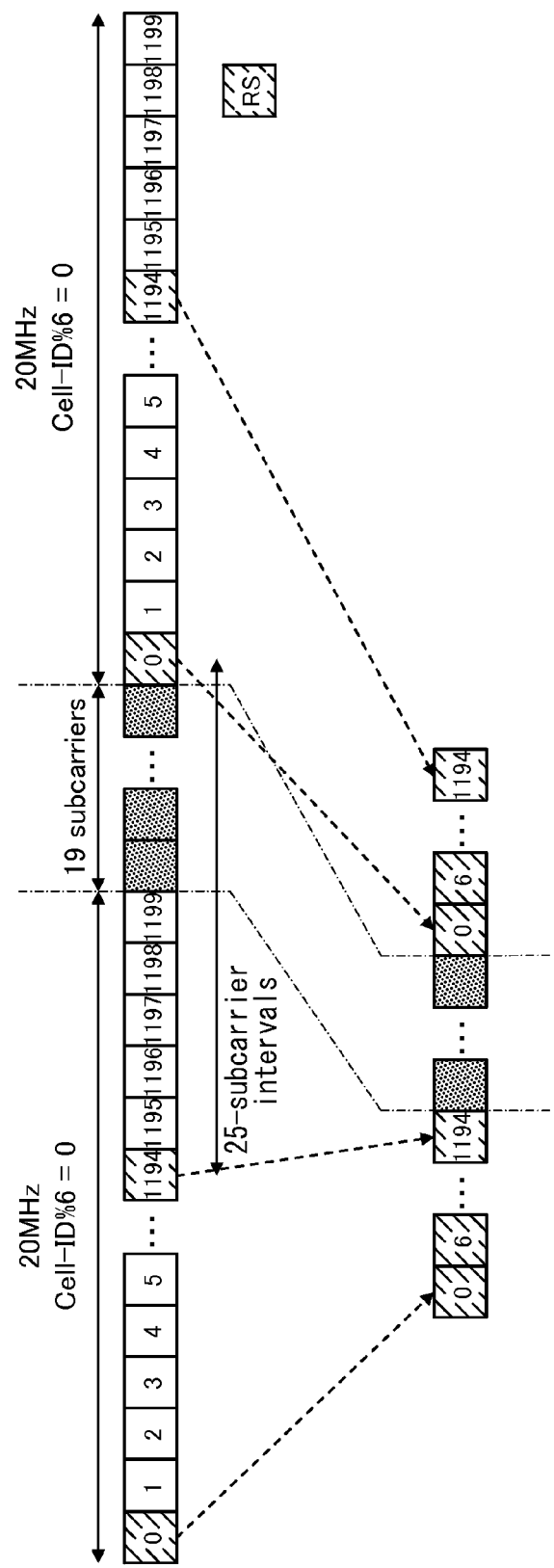
FIG. 5 is a diagram for explaining a problem associated with the arrangement of RSs on radio resources in a communication system according to the prior art.

For example, in the example of carrier aggregation using two contiguous component carriers depicted in FIG. 4, since the two component carriers are signals transmitted from the same transmitter (base station eNB), the mobile station UE as the receiver can perform the propagation channel estimation on the entirety of the 40-MHz signal. In this case, the subcarrier signals after FFT at the mobile station UE are as depicted in FIG. 5. In FIG. 5, as in FIG. 3, the resource elements, i.e., the subcarriers, in the first OFDM symbol are numbered in sequence starting from the band end. Within each component carrier, the RSs are arranged at constant intervals of six subcarriers, but between the component carriers, the subcarrier interval increases to 25 subcarriers. That is, since 19 null subcarriers are inserted between the two component carriers, the subcarrier interval between the 1194th subcarrier in the first component carrier and the 0th subcarrier in the second component carrier increases to 25 subcarriers. That is, the subcarrier interval between the two component carriers is not an integral multiple of six subcarriers. In this way, when the subcarrier interval between each RS is not equal, the amplitude and phase on the propagation channel differs from one RS to another, leading to the problem that the accuracy of the propagation channel estimate computed at the mobile station UE degrades.

Accordingly, in one aspect, it is an object of the embodiment to provide a transmitter, receiver, communication system, and communication method that can prevent the accuracy of propagation channel estimation from degrading when performing radio communications based on OFDM by using a plurality of carriers each with a predetermined bandwidth.

According to the transmitter, receiver, communication system, and communication method disclosed herein, the accuracy of propagation channel estimation can be prevented from degrading when performing radio communications based on OFDM by using a plurality of carriers each with a predetermined bandwidth.

(1) Embodiment 1

A first embodiment will be described below.

(1-1) Communication System

The communication system according to the embodiment performs communications using a downlink OFDM signal between a radio base station eNB (hereinafter simply called the "base station eNB") as the transmitter and a mobile station UE as the receiver. In the carrier (hereinafter called the "component carrier") having a predetermined bandwidth (20 MHz in LTE) used for the transmission of the OFDM signal, reference signals (hereinafter referred to as RSs or first signals) known to both the base station eNB and the mobile station UE are arranged at constant subcarrier intervals. Further, according to the communication system of the embodiment, when performing communications using a plurality of component carriers by means of carrier aggregation, RSs are inserted in the downlink OFDM signal at predetermined subcarrier intervals across the plurality of component carriers. In the following description, the component carrier is abbreviated "CC" where appropriate.

(1-2) Configuration of Base Station eNB and Mobile Station UE

Figure 6:
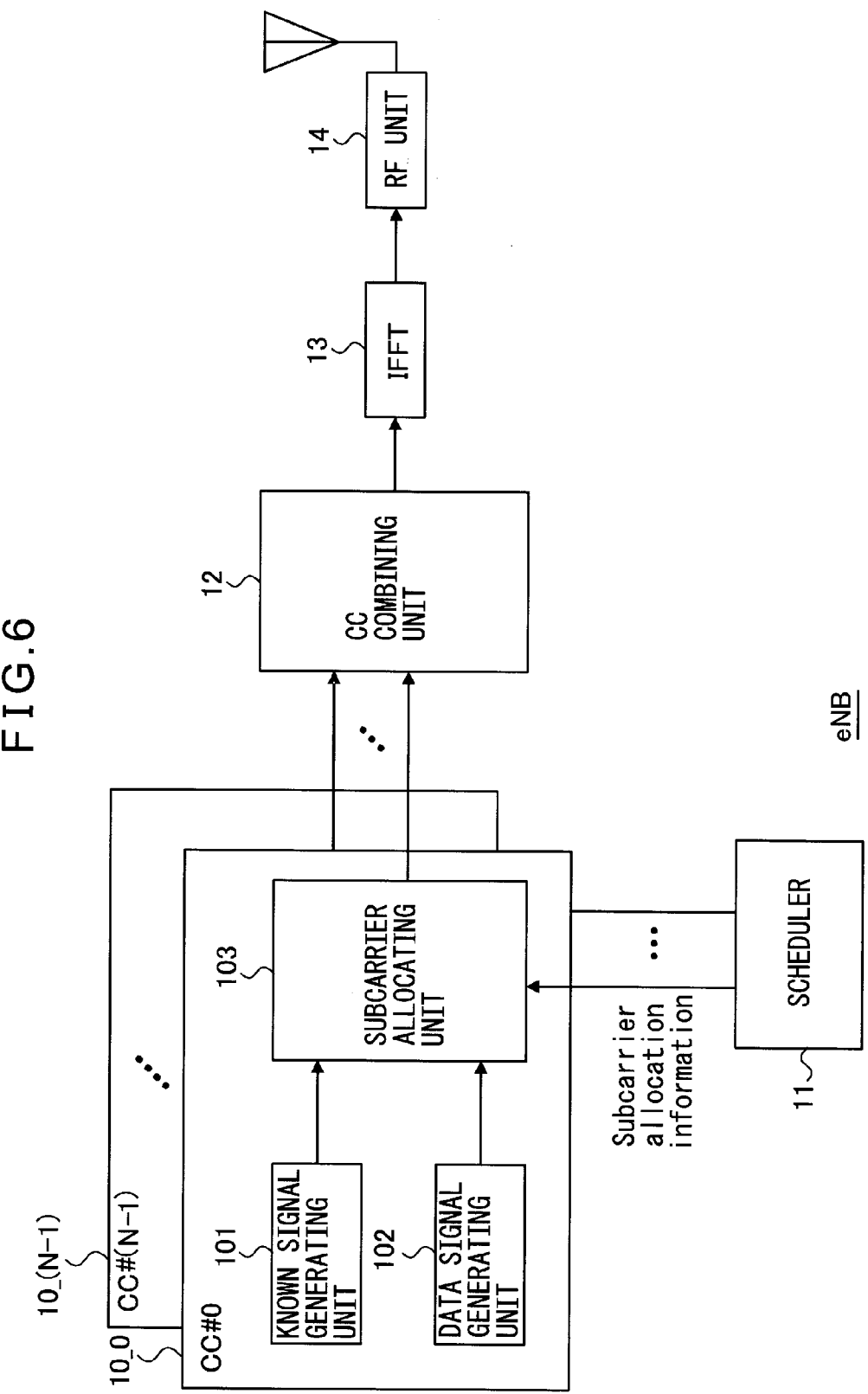
FIG. 6 is a block diagram schematically illustrating the configuration of a base station eNB according to a first embodiment.
Figure 7:
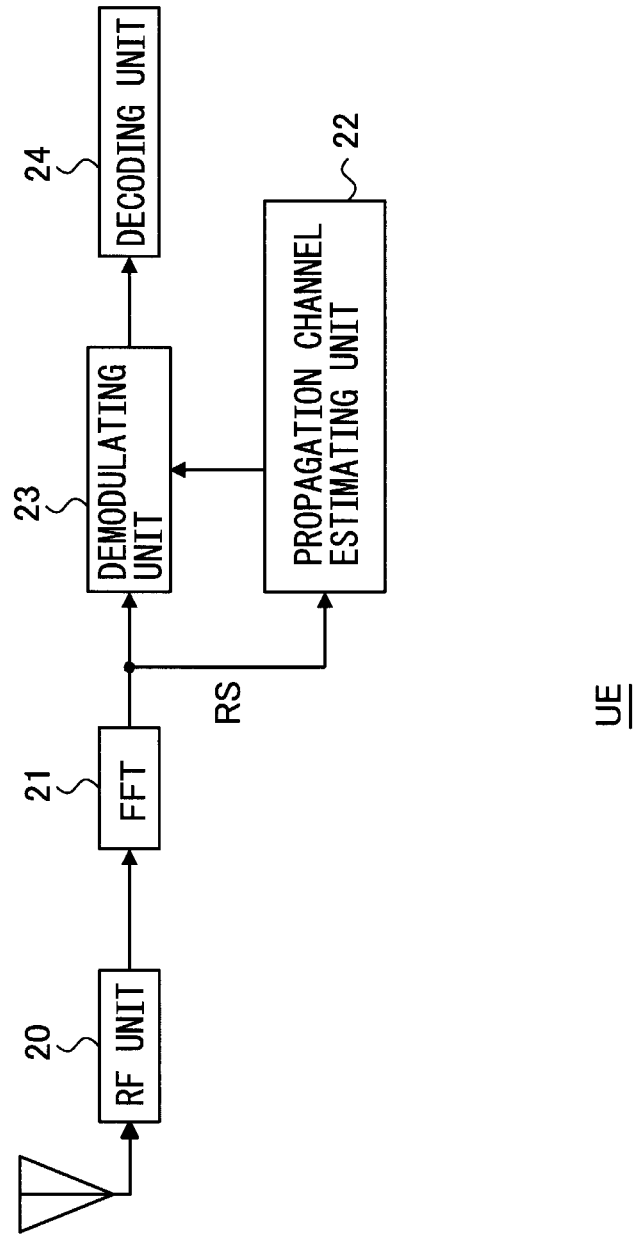
FIG. 7 is a block diagram schematically illustrating the configuration of a mobile station UE according to the first embodiment.
Figure 8:
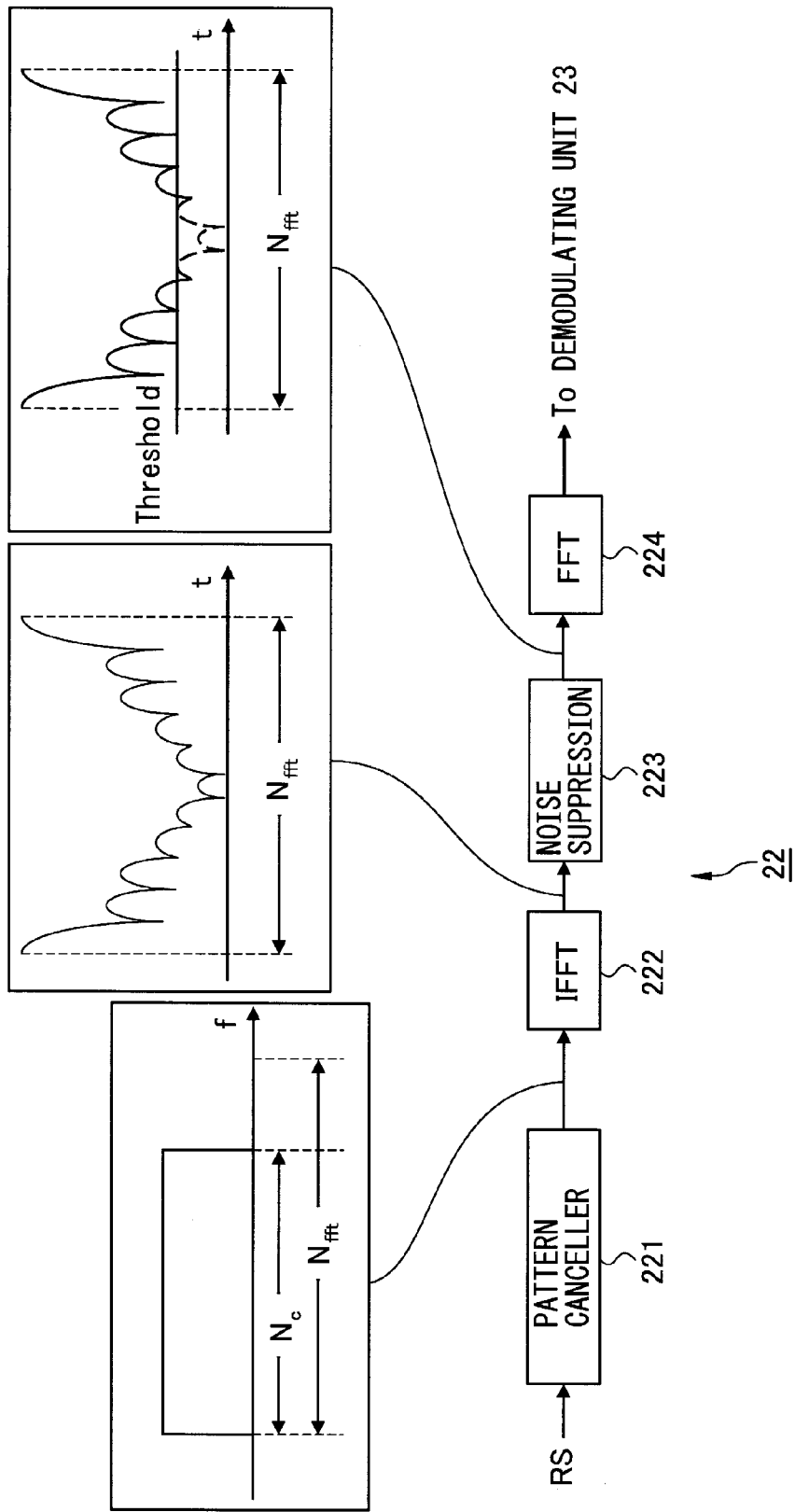
FIG. 8 is a detailed block diagram of a propagation channel estimating unit in the mobile station UE according to the first embodiment.

Next, the configuration of the base station eNB as the transmitter and the mobile station UE as the receiver will be described with reference to FIGS. 6 to 8. FIG. 6 is a block diagram schematically illustrating the configuration of the base station eNB. FIG. 7 is a block diagram schematically illustrating the configuration of the mobile station UE. FIG. 8 is a detailed block diagram of a propagation channel estimating unit in the mobile station UE.

Referring first to FIG. 6, the base station eNB includes N signal generating units 10_0 to 10_(N−1) corresponding to N component carriers, a scheduler 11, a CC combining unit 12, an IFFT unit 13, and an RF unit 14.

The signal generating units 10_0 to 10_(N−1) correspond to the component carriers CC#0 to CC#(N−1), respectively. Each signal generating unit includes a known signal generating unit 101, a data signal generating unit 102, and a subcarrier allocating unit 103. The known signal generating unit 101 generates a complex signal modulated by applying a modulation scheme, such as QPSK, to a bit sequence of a known signal such as an RS. The data signal generating unit 102 generates a complex signal modulated by applying a modulation scheme, such as QPSK, after applying coding such as error-correction turbo coding to a bit sequence of a data signal.

The subcarrier allocating unit 103, in accordance with the subcarrier allocation information supplied from the scheduler 11, maps the known signal (complex signal) generated by the known signal generating unit 101 and the data signal (complex signal) generated by the data signal generating unit 102 onto the radio resources allocated in the form of a resource block to the mobile station UE. That is, subcarrier mapping is performed. When performing communications using a plurality of component carriers, the scheduler 11 creates the subcarrier allocation information so that the RSs as the known signals are arranged at predetermined subcarrier intervals across the plurality of component carriers.

The subcarrier allocation information specifies for each component carrier the resource element to which each RS is to be mapped. For example, the subcarrier allocation information specifies subcarrier numbers for each OFDM symbol. If the premise is that the RSs are arranged at constant subcarrier intervals in each component carrier, the subcarrier allocation information may specify the offset from the band end (the leftmost end of the radio resources in FIG. 1) for starting the mapping of the RSs to the radio resources.

The CC combining unit 12 combines the N component carriers. That is, the CC combining unit 12 combines the component carriers the number of which is defined by

[NUMERAL 1]

$$\sum_{i=0}^{N-1} N_{sc\_i}$$

where $N_{sc\_i}$ is the number of effective subcarriers in the i-th component carrier. In this case, the RSs are arranged at equally spaced subcarrier intervals over the entire area of the combined component carriers.

The IFFT unit 13 applies an IFFT (Inverse Fast Fourier Transform) to the frequency-domain signals combined by the CC combining unit 12, thus transforming the combined signal into a time-domain signal, and appends a GI (Guard Interval) to the time-domain signal.

The RF unit 14 includes a D/A (digital to analog) converter, a local frequency oscillator, a mixer, a power amplifier, and a filter. The RF unit 14 upconverts the time-domain baseband OFDM signal, generated by the IFFT unit 13, from the baseband frequency to the radio frequency for radiation into space from a transmitting antenna.

Next, referring to FIG. 7, the mobile station UE includes an RF unit 20, an FFT unit 21, a propagation channel estimating unit 22, a demodulating unit 23, and a decoding unit 24.

The RF unit 20 converts the downlink RF signal received from the base station eNB by a receiving antenna into a digital baseband signal (OFDM signal). The RF unit 20 includes a band-limiting filter, a low-noise amplifier (LNA), a local frequency oscillator, a quadrature demodulator, an AGC (Automatic Gain Control) amplifier, and an A/D (analog to digital) converter.

The FFT unit 21 removes the GI (Guard Interval) from the received OFDM signal, applies an FFT (Fast Fourier Transform) to the OFDM signal received with a specifically set FFT window, and transforms the signal from the time domain to the frequency domain.

The propagation channel estimating unit 22 performs estimation on the downlink propagation channel from the base station eNB to the receiving mobile station, based on the frequency-domain signal recovered by the FFT unit 21, that is, the RS inserted at each designated subcarrier signal.

FIG. 8 depicts one configuration example of the propagation channel estimating unit 22. In the example depicted in FIG. 8, the propagation channel estimating unit 22 includes a pattern canceller 221, an IFFT unit 222, a noise suppressing unit 22, and an FFT unit 224.

The pattern canceller 221 performs pattern cancellation on the received RSs and converts the received signal into a signal of a prescribed waveform such as a rectangular wave. Next, the IFFT unit 222 applies an IFFT of length Nfft to a number, Nc, of subcarrier signals in the pattern-canceled signal. The noise suppressing unit 223 removes noise components from the time-domain signal after the IFFT by equating to zero any portion not larger than a predetermined threshold value. The FFT unit 224 applies an FFT to the signal whose noise components have been removed, and thus transforms the signal to the frequency-domain signal. A propagation channel estimate is thus obtained for each subcarrier. In the example depicted in FIG. 8, a signal of a rectangular wave is generated by the pattern canceller 21, and a signal of a sin c function is generated by the IFFT unit 222.

Turning back to FIG. 7, using the propagation channel estimate supplied from the propagation channel estimating unit 22, the demodulating unit 23 demodulates the signal mapped to each resource element, and the decoding unit 24 decodes the demodulated signal to recover the received bit sequence.

(1-3) Example of RS (Reference Signal) Arrangement

Figure 9:
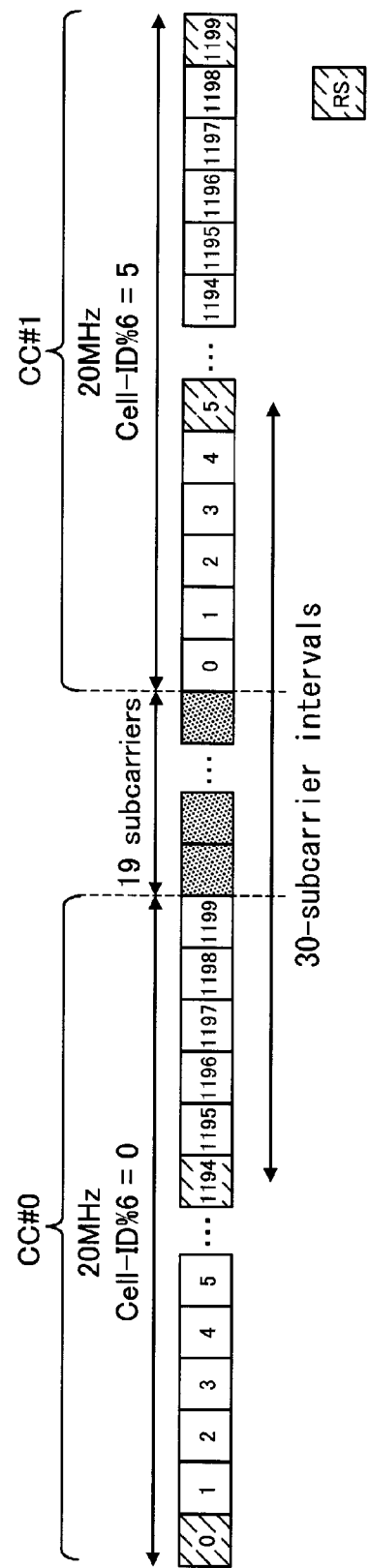
FIG. 9 is a diagram illustrating an example of arrangement in which RSs are arranged at predetermined subcarrier intervals across a plurality of component carriers according to the first embodiment.

Next, an example of arrangement in which RSs are arranged at predetermined subcarrier intervals across a plurality of component carriers will be described with reference to FIG. 9. FIG. 9 illustrates an example in which two 20-MHz component carriers CC#0 and CC#1 are combined together by inserting 19 null subcarriers (subcarriers not transmitting any signals) between the component carriers. In each component carrier, RSs are arranged at intervals of six subcarriers, as defined in LTE.

In FIG. 9, the resource elements, i.e., the subcarriers, in the first OFDM symbol in the radio resources of each component carrier are numbered in sequence starting from the band end. In this case, the scheduler 11 in the base station eNB creates subcarrier allocation information that specifies, for example, the offset "0" from the band end for the component carrier CC#0 and the offset "5" from the band end for the component carrier CC#1. Accordingly, in the component carrier CC#0, the RSs are arranged in accordance with the rule applicable to the case where the remainder on dividing the cell ID of the base station by 6 is 0 (Cell-ID %6=0), while in the component carrier CC#1, the RSs are arranged in accordance with the rule applicable to the case where the remainder on dividing the cell ID of the radio base station by 6 is 5 (Cell-ID %6=5). As a result, the subcarrier interval between the 1194th subcarrier in the component carrier CC#0 and the fifth subcarrier in the second component carrier CC#1 becomes equal to 30 subcarriers, since 19 null subcarriers are inserted between the two component carriers. That is, the subcarrier interval between the component carriers becomes equal to an integral multiple of six subcarriers, which means that the RSs are arranged at equally spaced subcarrier intervals over the entire area of the two combined component carriers CC#0 and CC#1.

As described above, in the communication system according to the present embodiment, radio communications using OFDM are performed between the base station eNB as the transmitter and the mobile station UE as the receiver, and RSs (first signals) as the known signals are arranged at predetermined subcarrier intervals (at intervals of six subcarriers in LTE) on the radio resources using a component carrier with a predetermined bandwidth (20-MHz bandwidth in LTE). When performing communications using a plurality of component carriers, the base station eNB inserts the RSs at predetermined subcarrier intervals (at intervals of six subcarriers in the present embodiment) on the radio resources across the plurality of component carriers. In this case, since the mobile station UE as the receiver can perform propagation channel estimation by extracting the RSs inserted at equally spaced subcarrier intervals across the plurality of component carriers, the accuracy of the propagation channel estimate does not degrade. That is, the accuracy of the propagation channel estimation at the mobile station UE can be prevented from degrading.

(2) Embodiment 2

A second embodiment will be described below.

In the present embodiment, a detailed description will be given of a method in which, when performing communications between the base station eNB as the transmitter and the mobile station UE as the receiver by aggregating a plurality of component carriers, RSs are inserted at equally spaced subcarrier intervals across the plurality of component carriers on the radio resources used for the communications. It is assumed here that the RSs are arranged at constant subcarrier intervals within each component carrier, and a description will be given of how the subcarrier offset from the band end (hereinafter simply called the "offset") for starting the mapping of the RSs to the radio resources is computed for each component carrier. The offset for each component carrier is computed by the scheduler 11 in the base station eNB (see FIG. 6). While the following description deals only with the RS offset in the first OFDM symbol, it is apparent that if provisions are made to insert the RS in accordance with a prescribed rule according to the cell ID, the offset in each of the second and subsequent OFDM symbols is automatically determined based on the offset in the first OFDM symbol.

In the present embodiment, it is assumed that no null subcarriers are inserted between the component carriers.

Figure 10:
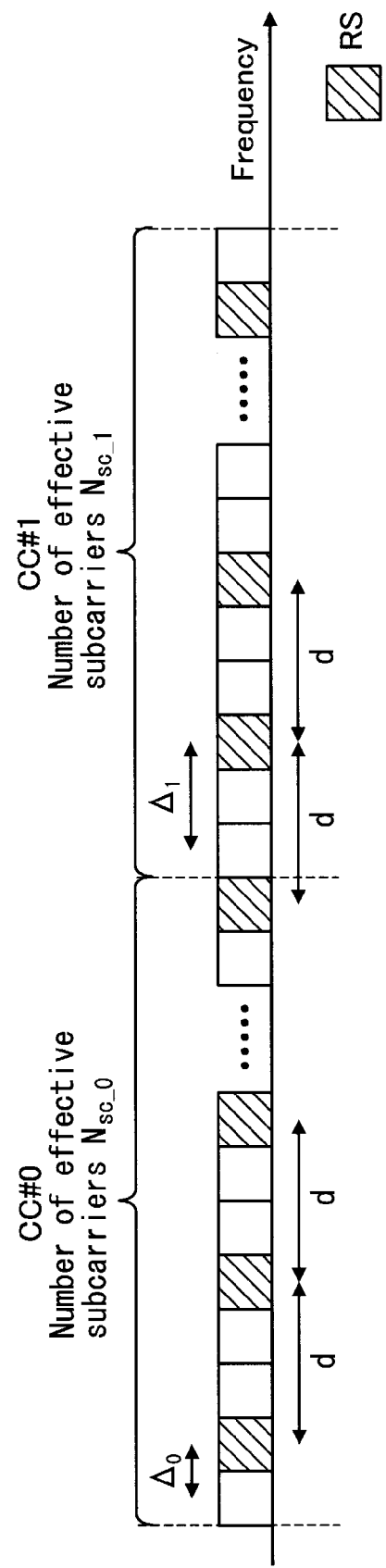
FIG. 10 is a diagram illustrating radio resources when two component carriers are aggregated according to a second embodiment.

FIG. 10 is a diagram illustrating the radio resource state when the two component carriers CC#0 and CC#1 are aggregated according to the present embodiment. As illustrated in FIG. 10, RSs are arranged at intervals of d subcarriers over the entire area of the component carriers. The number of effective subcarriers in each component carrier is prespecified according to the communication system; in the illustrated example, the numbers of effective subcarriers in the respective component carriers CC#0 and CC#1 are designated as $N_{sc\_0}$ and $N_{sc\_1}$, respectively. The RS offsets of the respective component carriers CC#0 and CC#1 are designated as $\Delta_0$ and $\Delta_1$, respectively. Here, to insert the RSs at equally spaced intervals of d, the RS offset $\Delta_0$ of the component carrier CC#0 is first determined as the initial value. The number of RSs to be inserted in the component carrier CC#0 is defined by the following equation (1). In equation (1), the symbol

[NUMERAL 2]

$$\lceil \rceil$$

means rounding up any fractions to the next whole number.

[NUMERAL 3]

$$\left\lceil \frac{N_{sc\_0} - \Delta_0}{d} \right\rceil \quad (1)$$

From equation (1), the offset $\Delta_1$ of the component carrier CC#1 can be computed by the following equation (2).

[NUMERAL 4]

$$\Delta_1 = \left\lceil \frac{N_{sc\_0} - \Delta_0}{d} \right\rceil \times d - (N_{sc\_0} - \Delta_0) \quad (2)$$

Figure 11:
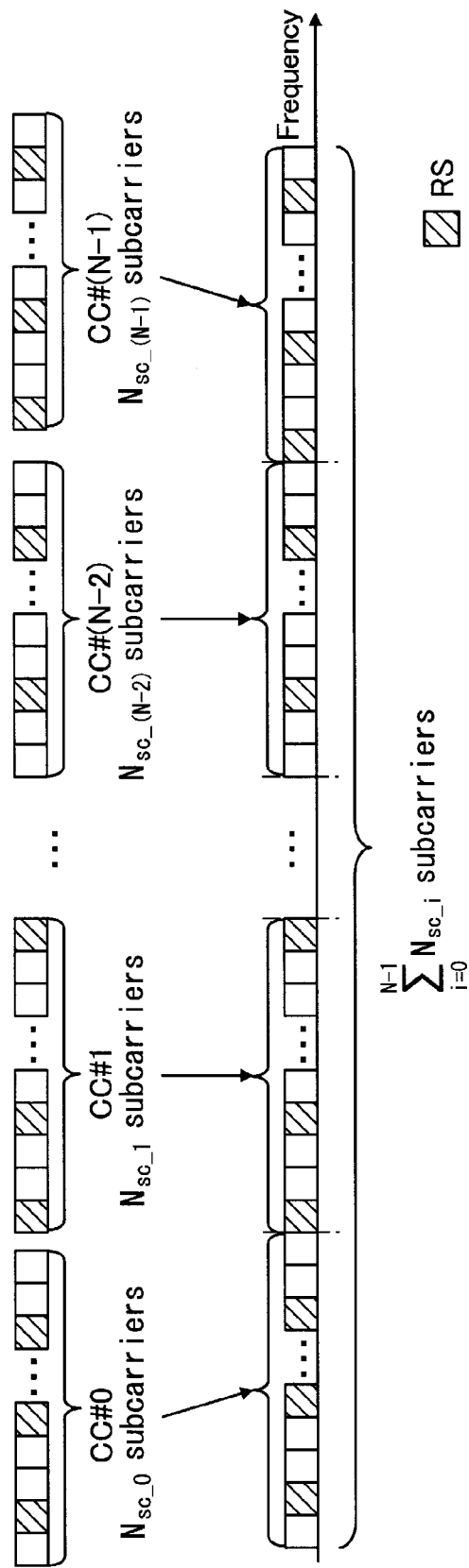
FIG. 11 is a diagram illustrating radio resources when N component carriers are aggregated according to the second embodiment.

The above equations (1) and (2) are given specifically for the case where the two component carriers CC#0 and CC#1 are aggregated, but the same applies for the case where three or more component carriers are aggregated. FIG. 11 is a diagram illustrating the radio resource state when N component carriers CC#0 to CC#(N−1) are aggregated according to the present embodiment. As illustrated in FIG. 11, the numbers of effective subcarriers in the respective component carriers CC#0 to CC#(N−1) are designated as $N_{sc\_0}$ to $N_{sc\_(N-1)}$, respectively. Accordingly, the sum of the numbers of effective subcarriers in the respective component carriers is given by

[NUMERAL 5]

$$\sum_{i=0}^{N-1} N_{sc\_i}$$

Provided that the offset $\Delta_0$ of the first component carrier CC#0 is given as the initial value, the offset $\Delta_j$ of any given component carrier CC#j (j=1, 2, ... ) necessary for the RSs to be arranged at equally spaced intervals of d in the given component carrier is defined by the following equation (3).

[NUMERAL 6]

$$\Delta_j = \left\lceil \frac{N_{sc\_(j-1)} - \Delta_{j-1}}{d} \right\rceil \times d - (N_{sc\_(j-1)} - \Delta_{j-1}) \quad (3)$$

Further, the subcarrier numbers $n_i$ ($n_i$=0, 1, 2, ..., $N_{sc\_i}$−1) to which the RSs are to be mapped in any given component carrier CC#i (i=0, 1, 2, ... ) are obtained from the following equations (4) and (5) by using the offset $\Delta_i$ given as shown by the above equation (3). The subcarrier numbers $n_i$ can be given as the earlier described subcarrier allocation information.

[NUMERAL 7]

$$n_i = m_i \times d + \Delta_i \quad (4)$$

[NUMERAL 8]

$$m_i = 0, 1, 2, \ldots, \left\lceil \frac{N_{sc\_i} - \Delta_i}{d} \right\rceil - 1 \quad (5)$$

The above equation (3) has been given based on the premise that the offset $\Delta_0$ of the first component carrier CC#0 is given as the initial value, but alternatively the offset $\Delta_1$ of the second component carrier CC#1 may be given as the initial value. In that case, the offset $\Delta_0$ is computed in accordance with the following equation (6).

[NUMERAL 9]

$$\Delta_0 = (N_{sc\_0} + \Delta_1) - \left\lfloor \frac{N_{sc\_0} + \Delta_1}{d} \right\rfloor \times d \quad (6)$$

In equation (6), the symbol

[NUMERAL 10]

$$\lfloor \rfloor$$

means discarding all fractions. In this case also, the offset and the subcarrier numbers to which the RSs are to be mapped can likewise be computed for each component carrier when three or more component carriers are aggregated.

Figure 12:
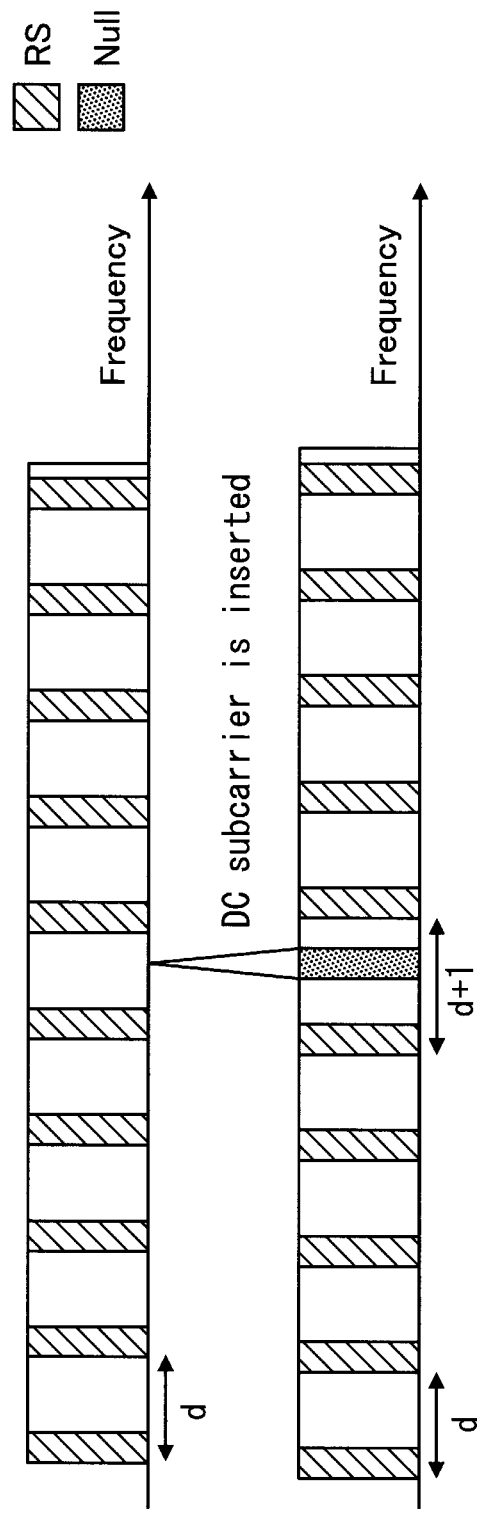
FIG. 12 is a diagram illustrating radio resources when a DC (null) subcarrier is inserted at a subcarrier position corresponding to the center of the carrier bandwidth, after arranging RSs at equally spaced subcarrier intervals.

In OFDM communications, there are cases where any DC subcarrier is set as a null subcarrier in order to cancel the DC offset. For example, in LTE, after the RSs are arranged at equally spaced intervals of d subcarriers, a DC (null) subcarrier is inserted at a subcarrier position corresponding to the center of the carrier bandwidth, as shown in FIG. 12. In this case, the interval between the RSs located before and after the inserted DC subcarrier is d+1; as a result, the RSs are not arranged at equally spaced subcarrier intervals in the carrier bandwidth, and this can degrade the accuracy of propagation channel estimation.

Figure 13:
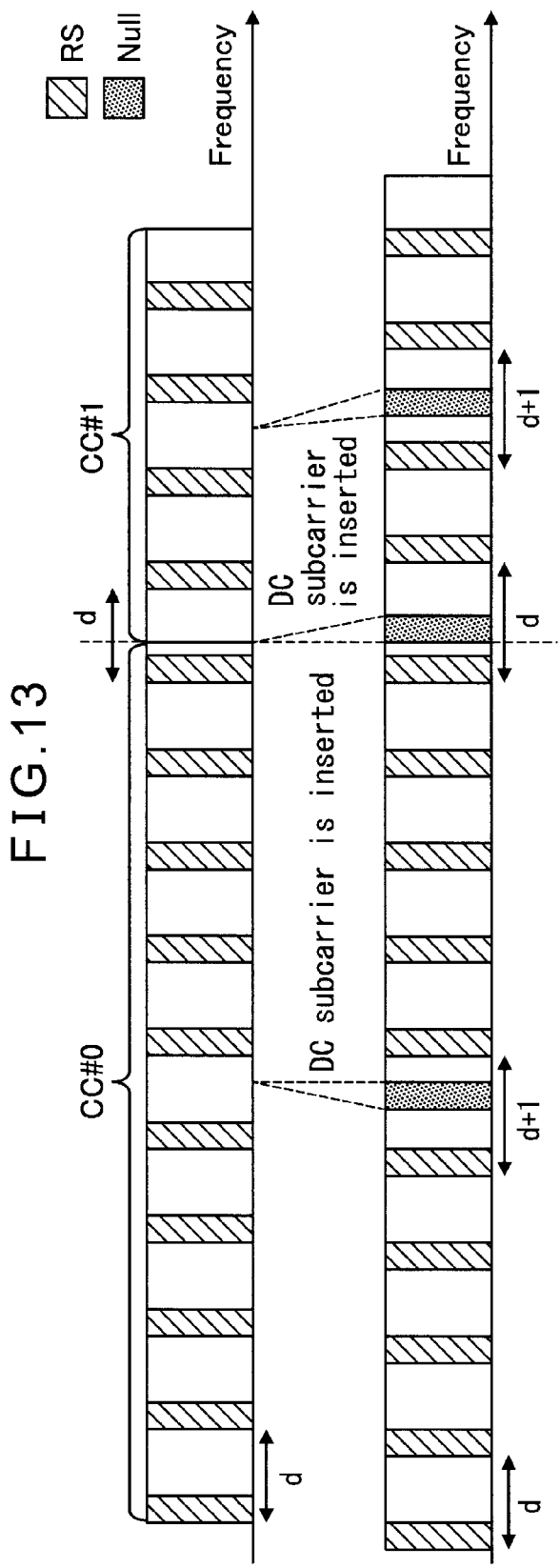
FIG. 13 is a diagram illustrating radio resources when DC (null) subcarriers are each inserted at a subcarrier position corresponding to the center of the carrier bandwidth after arranging RSs at equally spaced subcarrier intervals.

On the other hand, when performing carrier aggregation using a plurality of component carriers in which DC (null) carriers are to be inserted, if a DC (null) subcarrier is inserted between the adjacent component carriers, it is preferable to arrange the RSs as illustrated in FIG. 13. That is, by considering the DC (null) carrier inserted between the adjacent component carriers CC#0 and CC#1, the offset of the component carrier CC#1 is adjusted so that the subcarrier interval between the last RS in the component carrier CC#0 and the first RS in the component carrier CC#1 becomes equal to d subcarriers. Since the offset is thus maintained constant across the adjacent component carriers, the degradation of the accuracy of propagation channel estimation in each individual component carrier can be alleviated.

(3) Embodiment 3

A third embodiment will be described below.

The present embodiment differs from the second embodiment in that a group of null subcarriers is inserted as a guard band between the component carriers. In the present embodiment, no RSs are inserted in the guard band.

Figure 14:
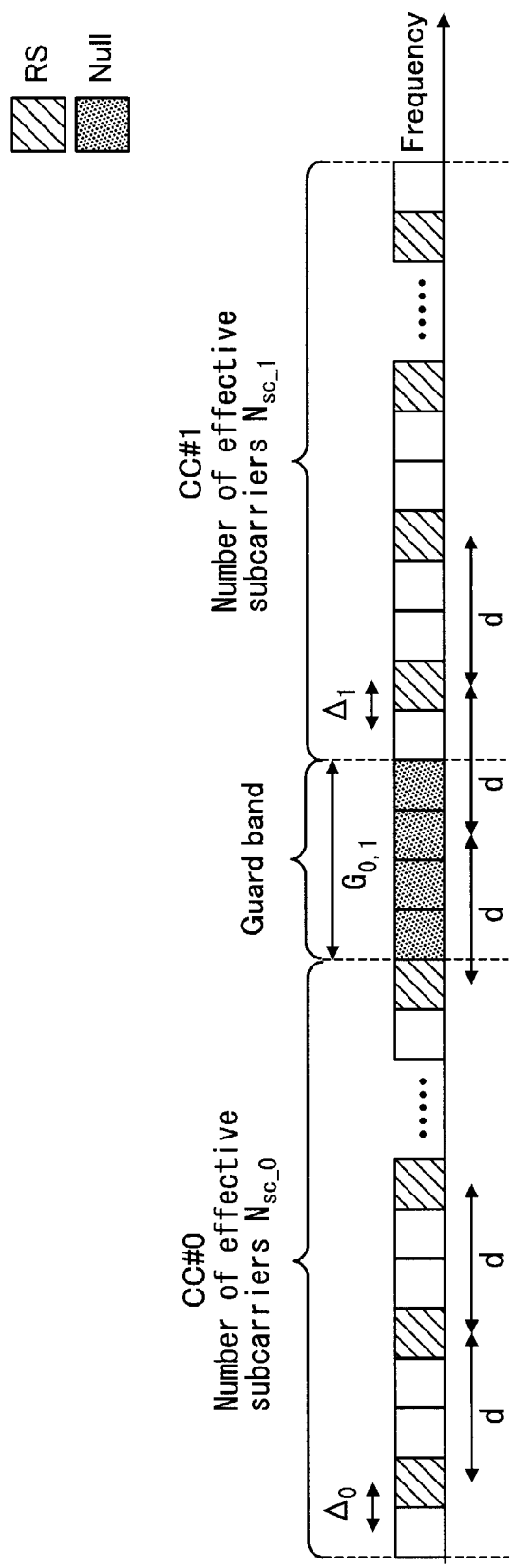
FIG. 14 is a diagram illustrating the radio resource state when two component carriers are aggregated according to a third embodiment.

FIG. 14 is a diagram illustrating the radio resource state when the two component carriers CC#0 and CC#1 are aggregated according to the present embodiment. FIG. 14 differs from FIG. 10 in that a guard band is inserted between the two component carriers CC#0 and CC#1. As in the second embodiment, in FIG. 14 also, the numbers of effective subcarriers in the respective component carriers CC#0 and CC#1 are designated as $N_{sc\_0}$ and $N_{sc\_1}$, respectively, and the RS offsets of the respective component carriers CC#0 and CC#1 are designated as $\Delta_0$ and $\Delta_1$, respectively. On the other hand, the number of subcarriers allocated to the guard band is designated as $G_{0,1}$. Here, if any RS were to be placed in the guard band, the RS offset $g_{0,1}$ of the guard band relative to the leftmost subcarrier in the guard band in FIG. 14 could be calculated by the following equation (7) in the same manner as the earlier given equation (2).

[NUMERAL 11]

$$g_{0,1} = \left\lceil \frac{N_{sc\_0} - \Delta_0}{d} \right\rceil \times d - (N_{sc\_0} - \Delta_0) \tag{7}$$

Substituting $g_{0,1}$ for $\Delta_0$ in the above equation (7), the offset $\Delta_1$ of the component carrier CC#1 is calculated as shown by the following equation (8).

[NUMERAL 12]

$$\Delta_1 = \left\lceil \frac{G_{0,1} - g_{0,1}}{d} \right\rceil \times d - (G_{0,1} - g_{0,1}) \tag{8}$$

The above equation (8) is given specifically for the case where the two component carriers CC#0 and CC#1 are aggregated, but the same applies for the case where three or more component carriers are aggregated. In that case, the offset $\Delta_j$ of any given component carrier CC#j (j=1, 2, 3, . . . ) is computed in accordance with the following equations (9) and (10). Here, $G_{(j-1),j}$ represents the number of subcarriers allocated to the guard band between the two adjacent component carriers CC#(j−1) and CC#j. On the other hand, $g_{(j-1),j}$ represents the RS offset of the guard band for the case where any RS were to be placed in the guard band between the two adjacent component carriers CC#(j−1) and CC#j.

[NUMERAL 13]

$$\Delta_j = \left\lceil \frac{G_{(j-1),j} - \Delta_{(j-1)}}{d} \right\rceil \times d - (G_{(j-1),j} - g_{(j-1),j}) \tag{9}$$

[NUMERAL 14]

$$g_{(j-1),j} = \left\lceil \frac{N_{sc\_(j-1)} - \Delta_{(j-1)}}{d} \right\rceil \times d - (N_{sc\_(j-1)} - \Delta_{(j-1)}) \tag{10}$$

Further, the subcarrier numbers $n_i$ ($n_i$=0, 1, 2, . . . , $N_{sc\_1}$−1) to which the RSs are to be mapped in any given component carrier CC#i (i=0, 1, 2, . . . ) are obtained from the following equations (11) and (12) by using the offset $\Delta_j$ given as shown by the above equation (9). The subcarrier numbers $n_i$ can be given as the earlier described subcarrier allocation information.

[NUMERAL 15]

$$n_i = m_i \times d + \Delta_i \tag{11}$$

[NUMERAL 16]

$$m_i = 0, 1, 2, \ldots, \left\lceil \frac{N_{sc\_i} - \Delta_i}{d} \right\rceil - 1 \tag{12}$$

Figure 15:
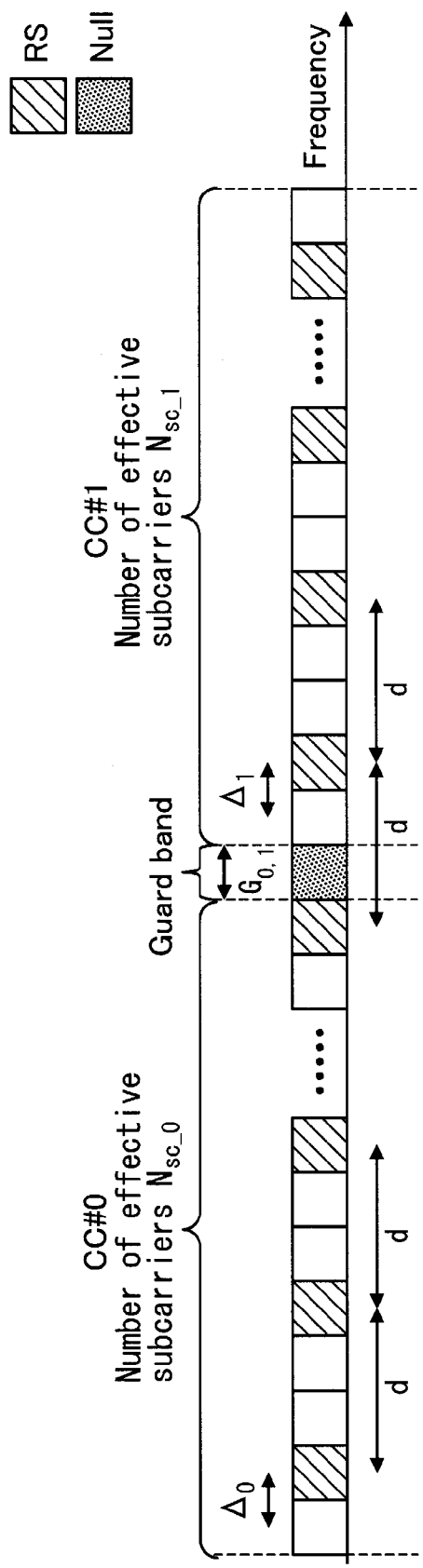
FIG. 15 is a diagram illustrating the radio resource state when the number of subcarriers allocated to a guard band according to the third embodiment is smaller than the number of subcarriers at which intervals the RSs are arranged.

There may be cases where the number, $G_{0,1}$, of subcarriers allocated to the guard band is smaller than the number of subcarriers at which intervals the RSs are arranged, as depicted in FIG. 15. In such cases, $g_{0,1}$ is calculated in accordance with the earlier given equation (8), and also, the difference $G_{0,1}-g_{0,1}$ is calculated. If the difference $G_{0,1}-g_{0,1}$ is positive, $\Delta_1$ is calculated in accordance with equation (8). If the difference $G_{0,1}-g_{0,1}$ is negative, $\Delta_1$ is calculated in accordance with the following equation (13) by equating the term

[NUMERAL 17]

$$\lceil \ \rceil$$

in equation (7) to 0.

[NUMERAL 18]

$$\Delta_1 = -(G_{0,1} - g_{0,1}) \tag{13}$$

Figure 16:
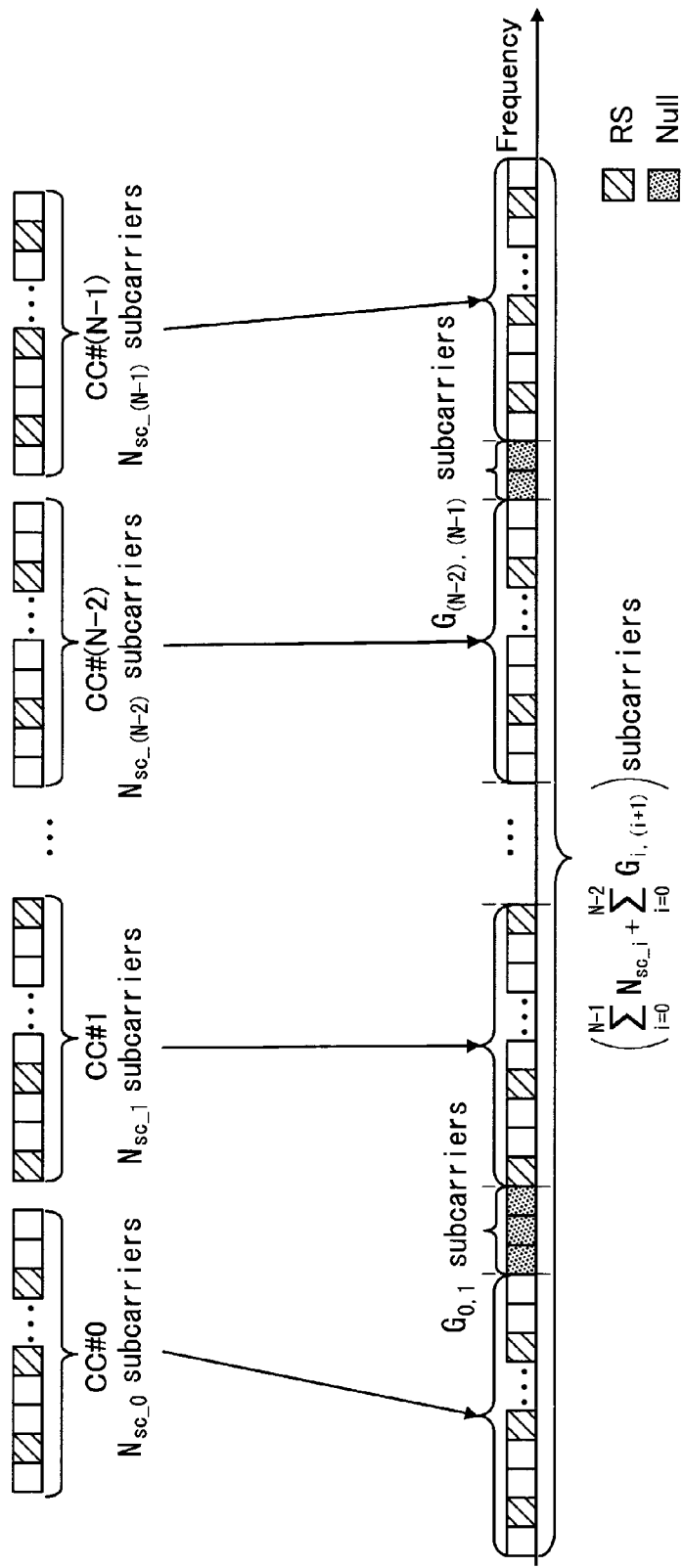
FIG. 16 is a diagram illustrating the output of a CC combining unit when a group of null subcarriers is inserted as a guard band between component carriers according to the third embodiment.

When a group of null subcarriers is inserted as a guard band between the component carriers, as described in the present embodiment, the output of the CC combining unit 12 (see FIG. 6) produces the signal depicted in FIG. 16. As indicated in FIG. 16, the number of subcarriers in the combined signal is given by the following equation (14). Then, by considering the number of subcarriers allocated to the guard band, the RSs are arranged at equally spaced subcarrier intervals over the entire area of the aggregated component carriers.

[NUMERAL 19]

$$\left( \sum_{i=0}^{N-1} N_{sc\_i} + \sum_{i=0}^{N-2} G_{i,(i+1)} \right) \tag{14}$$

(4) Embodiment 4

A fourth embodiment will be described below.

The present embodiment is the same as the third embodiment in that a group of null subcarriers is inserted as a guard band between the component carriers, but differs in that an RS is also inserted in the guard band.

Figure 17:
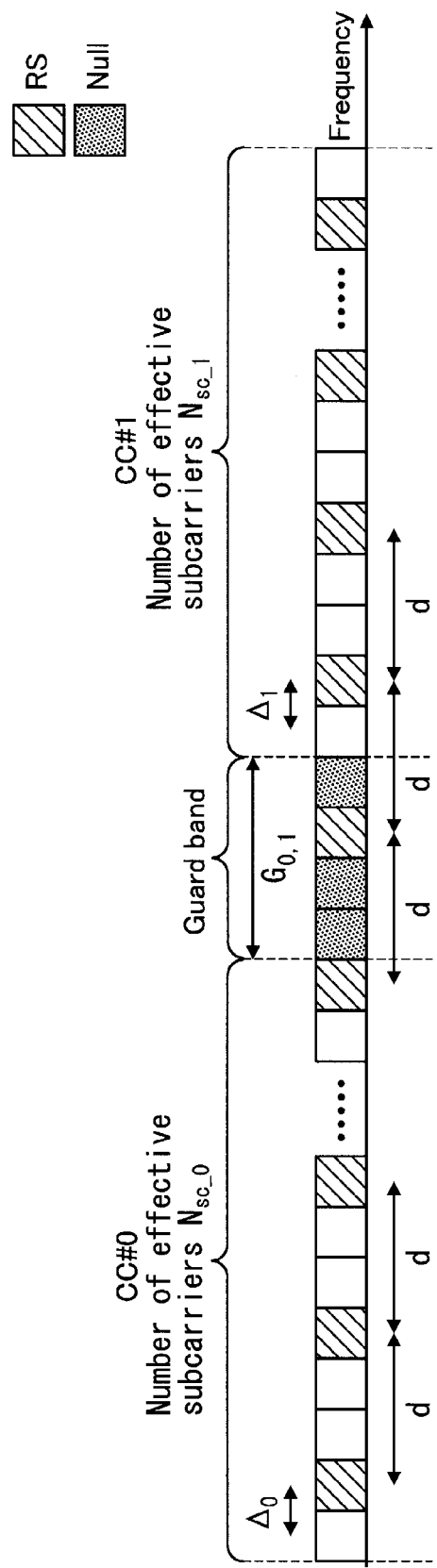
FIG. 17 is a diagram illustrating the radio resource state when two component carriers are aggregated according to a fourth embodiment.

FIG. 17 is a diagram illustrating the radio resource state when the two component carriers CC#0 and CC#1 are aggregated according to the present embodiment. FIG. 17 differs from FIG. 14 in that an RS is also inserted in the guard band between the two component carriers CC#0 and CC#1. In the present embodiment, the RSs are arranged at predetermined subcarrier intervals over the entire area of the plurality of aggregated component carriers, including the guard band provided between the adjacent component carriers. Since this eliminates discontinuities in the frequency domain that may occur when performing FFT for propagation channel estimation at the receiving mobile station UE, the accuracy of the propagation channel estimation can be further enhanced, compared with the third embodiment.

If any RS is to be inserted in the guard band between two adjacent component carriers CC#(j−1) and CC#j, the RS offset $g_{(j-1),j}$ of the guard band can be calculated using the earlier given equation (10). Accordingly, the number of RSs that can be inserted in the guard band between the component carriers CC#(j−1) and CC#j is given by the following equation (15). However, if the difference $G_{i,(i+1)} - g_{i,(i+1)}$ is negative, the number of RSs that can be inserted in the guard band is 0.

[NUMERAL 20]

$$\left\lceil \frac{G_{i,(i+1)} - g_{i,(i+1)}}{d} \right\rceil \quad (15)$$

When the number of subcarriers inserted as the guard band between the component carriers CC#i and CC#(i+1) is denoted by $G_{i,(i+1)}$, and the subcarrier number of each given subcarrier is denoted by $k_{i,(i+1)}$ ($k_{i,(i+1)}=0, 1, 2, \ldots, G_{i,(i+1)}-1$), the subcarrier numbers at which the RSs are placed are given by the following equation (16) by using the offset $g_{i,(i+1)}$ given by equation (10).

[NUMERAL 21]

$$k_{i,(i+1)} = l_{i,(i+1)} \times d + g_{i,(i+1)} \quad (16)$$

In equation (16)

[NUMERAL 22]

$$l_{i,(i+1)} = 0, 1, 2, \ldots, \left\lceil \frac{G_{i,(i+1)} - g_{i,(i+1)}}{d} \right\rceil - 1 \quad (17)$$

Figure 18:
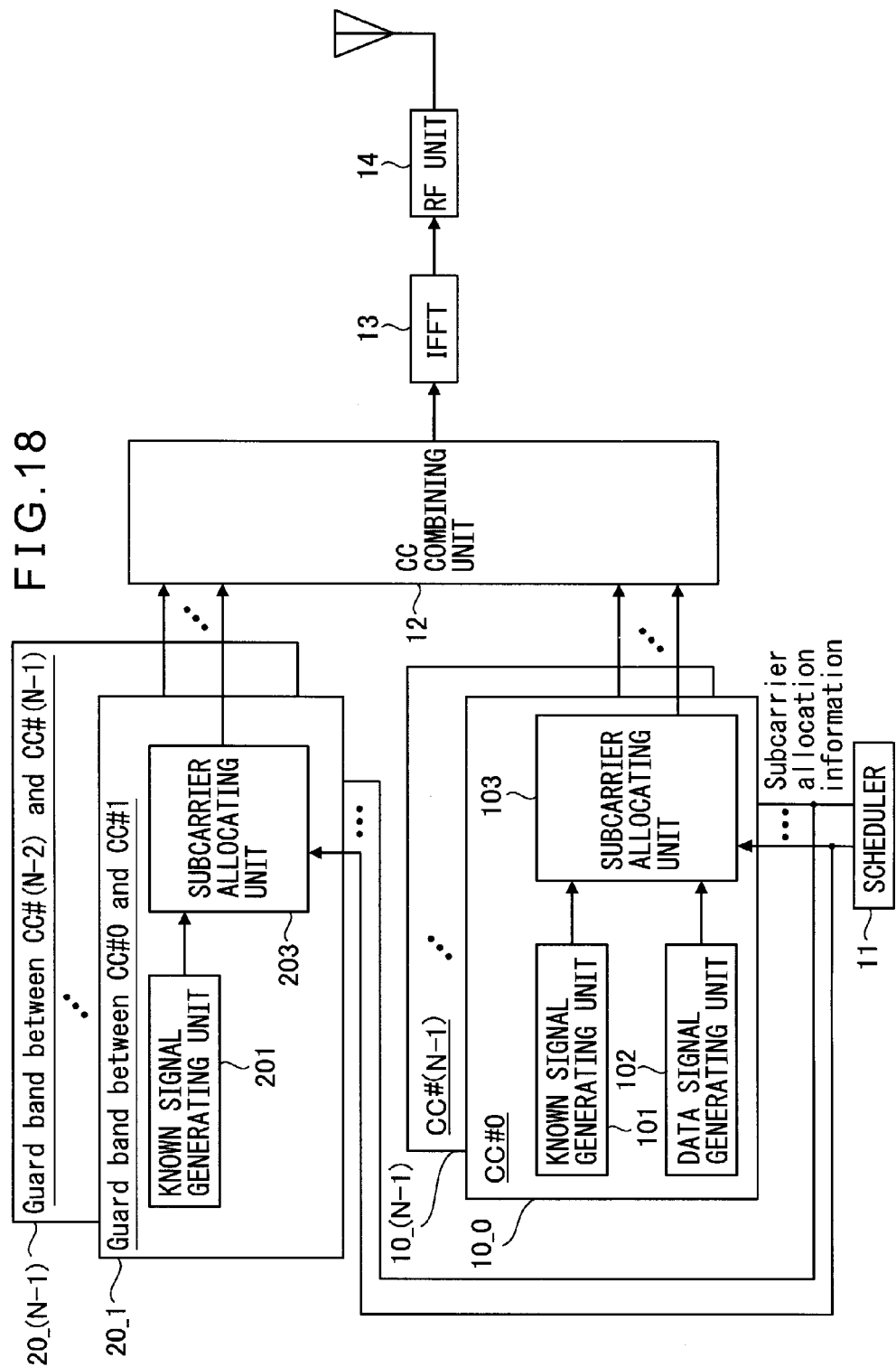
FIG. 18 is a block diagram schematically illustrating the configuration of a base station eNB according to the fourth embodiment.

Next, a configuration example of the base station eNB as the transmitter according to the present embodiment will be described with reference to FIG. 18. FIG. 18 is a block diagram schematically illustrating the configuration of the base station eNB. In FIG. 18, the same component elements as those in FIG. 6 are designated by the same reference numerals.

The configuration of FIG. 18 differs from that of FIG. 6 in the following respect. That is, the base station eNB depicted in FIG. 18 further includes signal generating units 20_1 to 20_(N−1) each for generating a signal to be assigned to the guard band provided between adjacent component carriers. The signal generating unit 20_1 generates a signal to be assigned to the guard band between the component carriers CC#0 and CC#1. Likewise, each of the other signal generating units generates a signal to be assigned to its associated guard band. For example, the signal generating unit 20_(N−1) generates a signal to be assigned to the guard band provided between the component carriers CC# (N−2) and CC#(N−1).

The signal generating units 20_1 to 20_(N−1) each include a known signal generating unit 201 and a subcarrier allocating unit 203. The known signal generating unit 201 generates a signal of a given DC level corresponding to null. The subcarrier allocating unit 203 allocates the DC level signal generated by the known signal generating unit 201 to the guard band in accordance with the subcarrier allocation information supplied from the scheduler 11. The CC combining unit 12 generates a frequency-domain signal by combining the N component carriers and their guard bands.

(5) Embodiment 5

A fifth embodiment will be described below.

The present embodiment is the same as the fourth embodiment in that RSs are also inserted in the guard band provided as a group of null subcarriers between the component carriers, but differs in that the RSs are arranged, not over the entire area of the guard band, but only in designated portions thereof.

FIGS. 19A and 19B are diagram illustrating the radio resource state when the two component carriers CC#0 and CC#1 are aggregated according to the present embodiment.

For comparison purposes, FIG. 19A illustrates the arrangement of RSs according to the fourth embodiment, and FIG. 19B illustrates the arrangement of RSs according to the present embodiment. As illustrated in FIG. 19, in the arrangement of RSs according to the present embodiment, the RSs are inserted only at the subcarriers located close to the respective adjacent component carriers (that is, the subcarriers at gb1 to gb3 in FIG. 19) among the plurality of subcarriers provided in the guard band. The number of RSs to be inserted in the guard band is set in advance. For example, in the case of the guard band depicted in FIG. 19, when inserting RSs at a number, A, of subcarriers located close to the component carrier CC#0 and at a number, B, of subcarriers located close to the component carrier CC#1, the numbers A and B are set in advance. In this case, the numbers A and B may be different from each other or may be different for each guard band.

In the earlier described third embodiment, since no RSs are placed in the guard band, the function of the guard band works well, but since discontinuities occur in the frequency domain when performing FFT for propagation channel estimation, the accuracy of propagation channel estimation degrades especially at the subcarriers in each component carrier that are located close to the guard band. On the other hand, in the foregoing fourth embodiment, since the RSs are arranged over the entire area of the guard band, discontinuities in the frequency domain that may occur when performing FFT for propagation channel estimation are eliminated, offering the effect of greatly enhancing the accuracy of propagation channel estimation, but there can occur cases where the function of the guard band does not work well. By contrast, according to the present embodiment, the function of the guard band can be made to work adequately, while preventing the accuracy of propagation channel estimation from degrading at the subcarriers in each component carrier that are located close to the guard band.

(6) Embodiment 6

A sixth embodiment will be described below.

Figure 2A:
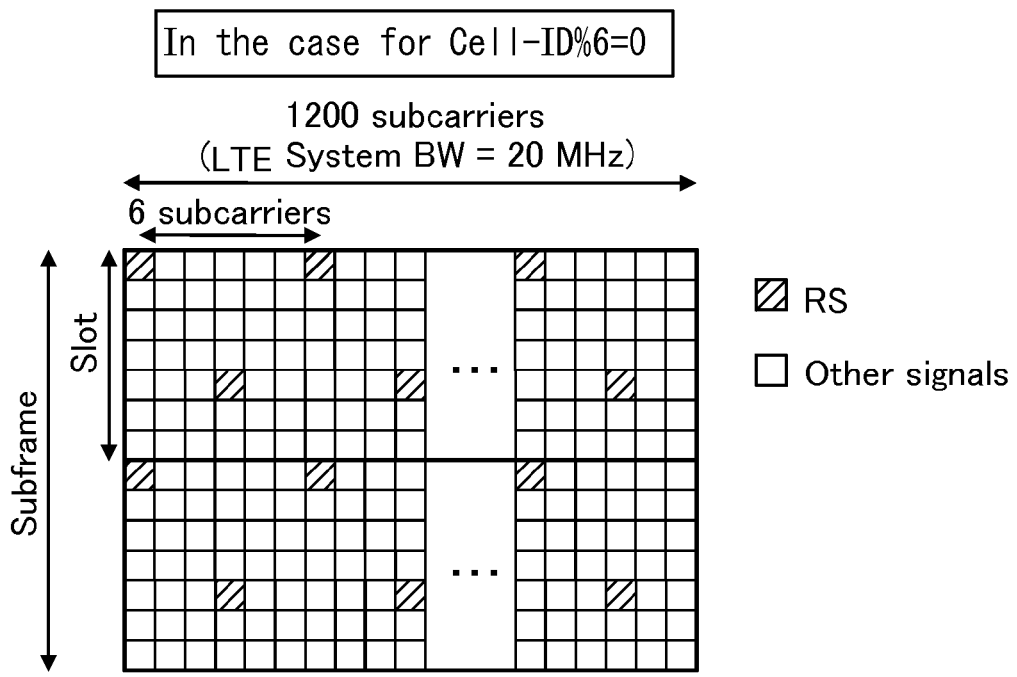
FIGS. 2A and 2B are diagrams illustrating how reference signals (RSs) are arranged on radio resources in a communication system according to the prior art.
Figure 2B:
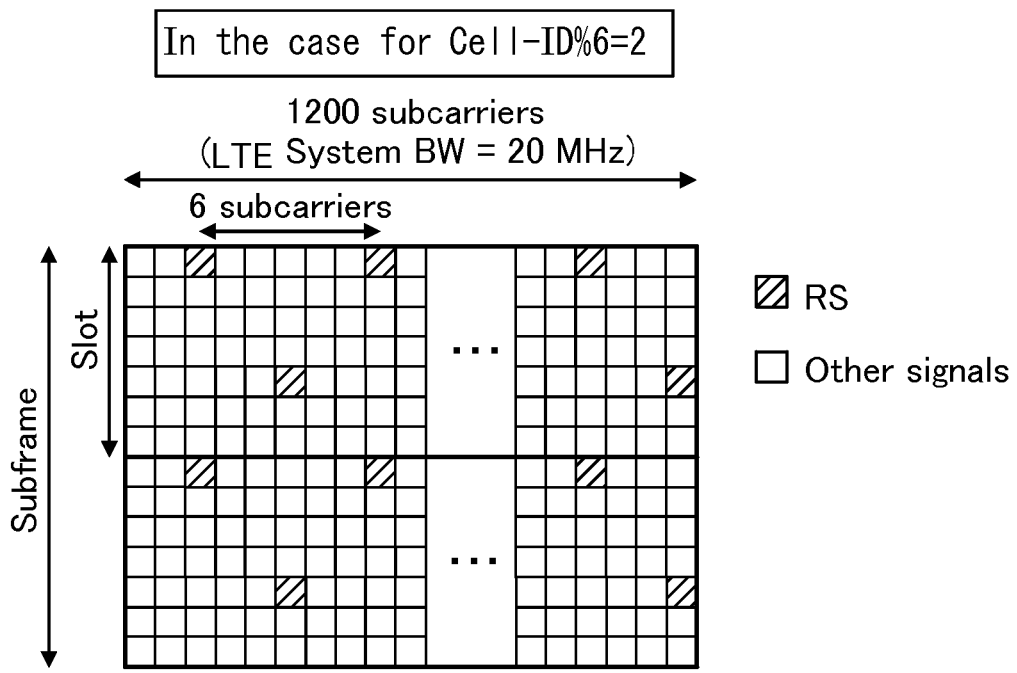
Figure 20:
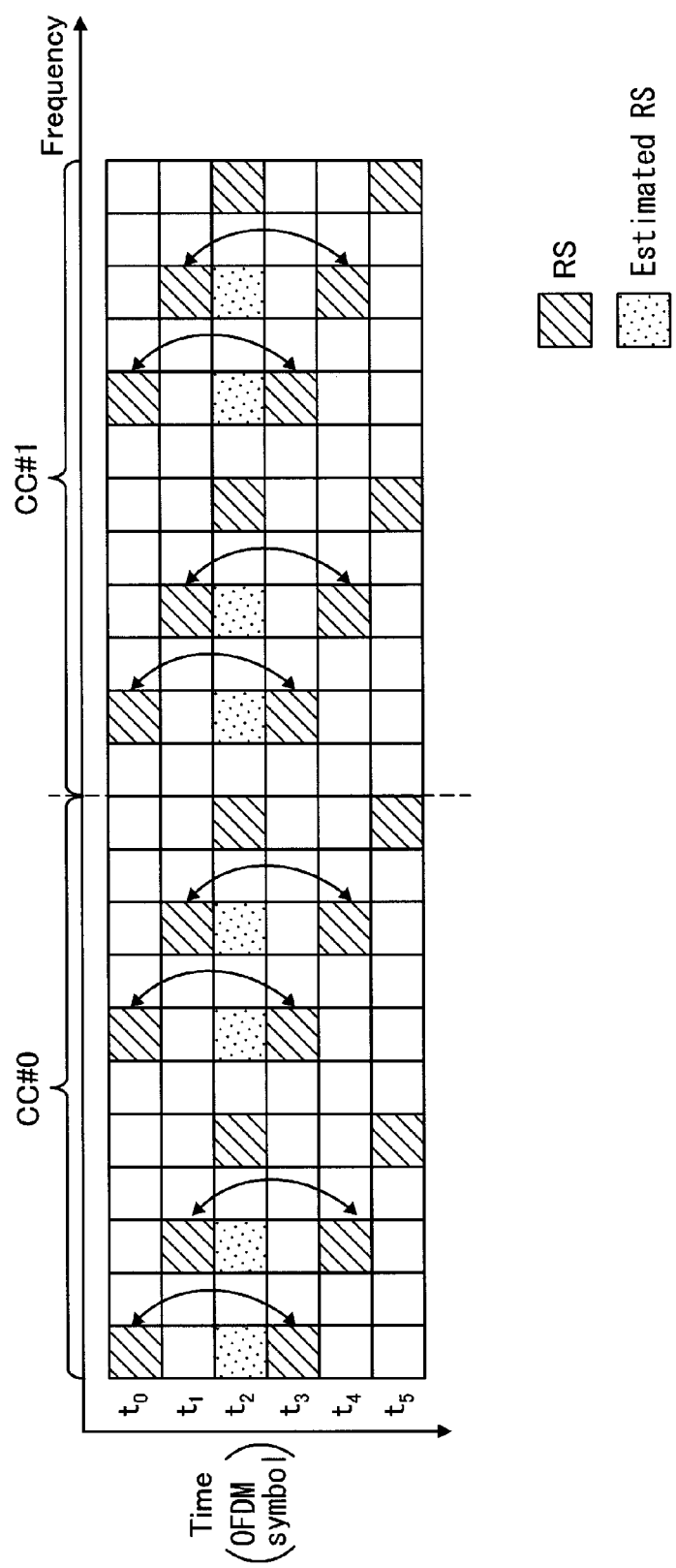
FIG. 20 is a diagram illustrating an example of how estimated RSs are computed according to a sixth embodiment when RSs are arranged at equally spaced subcarrier intervals over the entire area of aggregated component carriers.

While each of the above embodiments has been described by focusing primarily on the RS offset only for the first OFDM symbol, it is apparent that the offset determining method can be extended to other OFDM symbols, because generally there is regularity in the way the RS offset is determined for each OFDM symbol, as previously depicted in FIG. 2. FIG. 20 illustrates by way of example the radio resources in which the RS offset differs from one OFDM symbol to another. In the illustrated example, the RS offsets at times t0, t1, t2, t3, t4, and t5 are 0, 2, 4, 0, 2, and 4, respectively, that is, the RS offset differs for each OFDM symbol. However, since there is regularity between the OFDM symbol and the RS offset, once the RS offset in the first OFDM symbol is determined as described in each of the above embodiments, the RS offset in each of the second and subsequent OFDM symbols is automatically determined.

In each of the above embodiments, the RSs have been arranged at equally spaced subcarrier intervals over the entire area of the component carriers, as illustrated in the example of RS arrangement of FIG. 20. By contrast, in the present embodiment, a description will be given of a method of arranging the RSs on the radio resources wherein provisions are made so that even when the RSs are not arranged at equally spaced subcarrier intervals, processing can be performed between the transmitter and the receiver as if the RSs were arranged at equally spaced subcarrier intervals, by computing RS estimated signals.

First, a method of computing the RS estimated signals (hereinafter called the "estimated RSs") will be described with reference to FIG. 20.

FIG. 20 illustrates as an example the case where the estimated RSs are computed at time t2. In the radio resources in which the RSs are arranged as illustrated in FIG. 20, there is no need to compute estimated RSs where the RSs are arranged in the OFDM symbol at time t2. Where the RSs are not arranged in the OFDM symbol at time t2, estimated RSs are each computed by interpolation from the two RSs located in the same subcarrier but at different times. In FIG. 20, the RSs from which each estimated RS is computed by interpolation are indicated by a double-headed arrow. For example, in the first subcarrier depicted in FIG. 20, the estimated RS at time t2 is computed by interpolation from the RSs at time t0 and time t3. As a result, at time t2, the prearranged RSs and the estimated RSs in combination are arranged at equally spaced intervals of two subcarriers over the entire area of the aggregated component carriers CC#0 and CC#1. In like manner, at any other time than time t2, the RSs can be arranged at equally spaced intervals of two subcarriers over the entire area of the aggregated component carriers CC#0 and CC#1.

Figure 21:
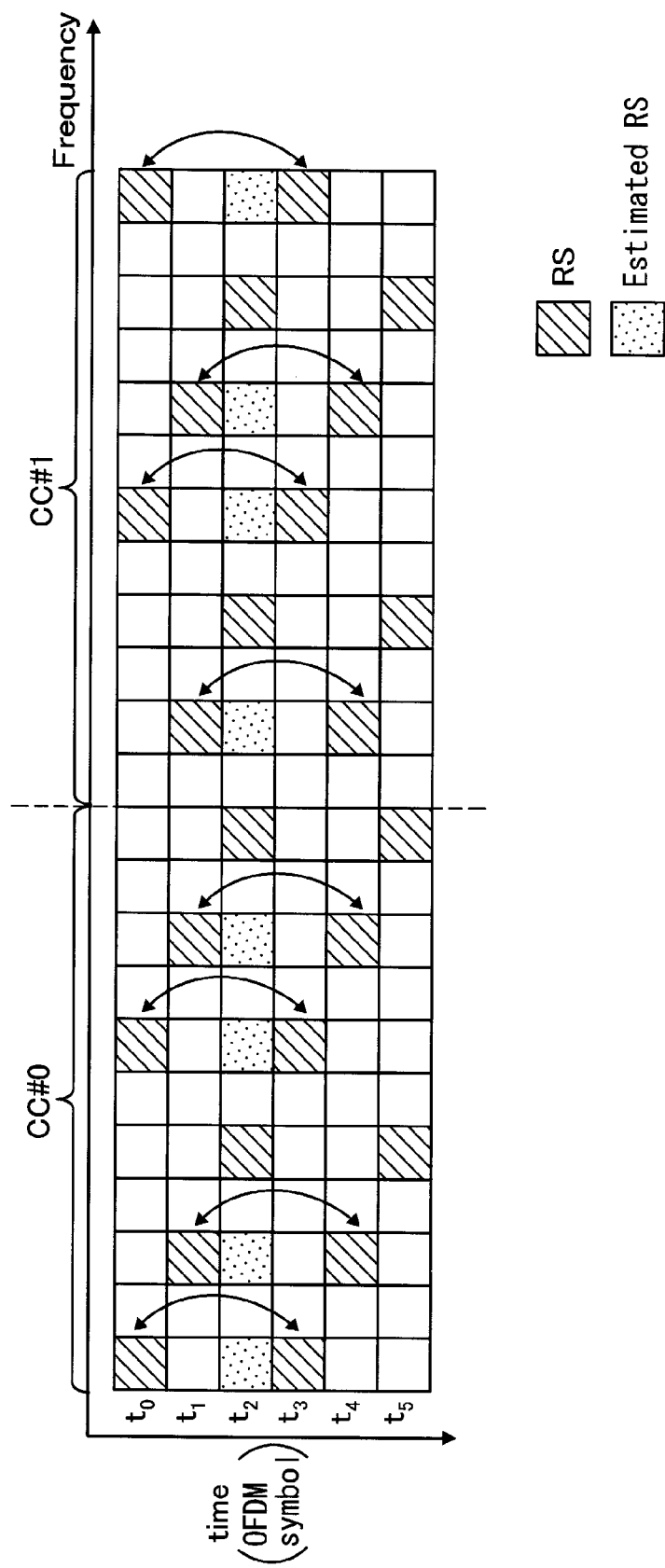
FIG. 21 is a diagram illustrating an example of how estimated RSs are computed according to the sixth embodiment when RSs are not arranged at equally spaced subcarrier intervals over the entire area of aggregated component carriers.

Unlike FIG. 20, FIG. 21 illustrates as an example the case where the RSs are not arranged at equally spaced subcarrier intervals over the entire area of the aggregated component carriers CC#0 and CC#1. In this case also, the estimated RSs are computed in the same manner as the estimated RS computation method described with reference to FIG. 20. As a result, at time t2, the prearranged RSs and the estimated RSs in combination are arranged at equally spaced intervals of two subcarriers over the entire area of the aggregated component carriers CC#0 and CC#1. In like manner, at any other time than time t2, the RSs can be arranged at equally spaced intervals of two subcarriers over the entire area of the aggregated component carriers CC#0 and CC#1.

In this way, even when the RSs are not arranged at equally spaced subcarrier intervals over the entire area of the aggregated component carriers CC#0 and CC#1, since the RSs can be arranged at equally spaced subcarrier intervals in a simulated way, the accuracy of propagation channel estimation can be enhanced.

The estimated RSs can be computed when the RSs are arranged so as to satisfy the following conditions (A) to (C).

(A) There are p RS offset patterns different for different times.

(B) At any given time, the RSs in each component carrier are arranged at equally spaced intervals of d.

(C) The value of d/p is an integer, and the difference between any two of the p offsets is an integral multiple of d/p.

In the case of FIG. 21, assuming that d=6, the RS offsets $\Delta_0$ of the component carrier CC#0 at times t0, t1, and t2 are 0, 2, and 4, respectively; therefore, the estimated RSs can be computed by determining the corresponding offsets $\Delta_1$ of the component carrier CC#1 based on one of cases 1 to 6 shown in Table 1 below.

TABLE 1

|  | TIME 1 | | TIME 2 | | TIME 3 | |
| --- | --- | --- | --- | --- | --- | --- |
|  | $\Delta_0$ | $\Delta_1$ | $\Delta_0$ | $\Delta_1$ | $\Delta_0$ | $\Delta_1$ |
| Case 1 | 0 | 5 | 2 | 1 | 4 | 3 |
| Case 2 | 0 | 5 | 2 | 3 | 4 | 1 |
| Case 3 | 0 | 3 | 2 | 1 | 4 | 5 |
| Case 4 | 0 | 3 | 2 | 5 | 4 | 1 |
| Case 5 | 0 | 1 | 2 | 3 | 4 | 5 |
| Case 6 | 0 | 1 | 2 | 5 | 4 | 3 |

(7) Embodiment 7

A seventh embodiment will be described below.

In the above second to fifth embodiments, the RS offset $\Delta_0$ of the component carrier CC#0 has been used as the basis on which to compute the offset $\Delta_j$ (j=1, 2, 3, ..., N−1) of any other component carrier CC#j to be combined with it. However, in LTE, the arrangement of RSs on the radio resources is determined by the cell ID of the transmitting base station eNB. That is, once the cell ID of the base station eNB is determined, the RS offset is uniquely determined. In the present embodiment, therefore, a description will be given of a method of determining the cell ID for each component carrier so that the RSs are arranged at equally spaced subcarrier intervals over the entire area of the plurality of aggregated component carriers.

For example, in LTE, the RS offset $\Delta_i$ in the radio resources of the base station eNB is determined by its cell ID in accordance with the following equation (18). In LTE, $n_{cell-ID,i}$ is in the range of 0 to 503, and d=6.

[NUMERAL 23]

$$\Delta_i = n_{cell-ID,i} \bmod(d) \tag{18}$$

Therefore, once the offset $\Delta_i$ (i=0, 1, 2, ...) of each component carrier is computed in accordance with the method described in each of the above embodiments, the cell ID $n_{cell-ID,i}$ to be assigned to each component carrier can be computed by the following equation (19). Here, "a" in equation (10) takes the value given by equation (20).

[NUMERAL 24]

$$n_{cell-ID,i} = 6a + \Delta_i \tag{19}$$

[NUMERAL 25]

$$a = 0, 1, 2, \ldots, 504/6 - 1 \tag{20}$$

In this case, the cell ID of each component carrier is selected from among the 84 (=504/6) possible cell IDs that can be obtained from equation (19) by using the computed $\Delta_i$ and the given value "a" in the above equation (20). In the present embodiment, the cell ID assigned to each component carrier can be specified as the subcarrier allocation information.

The various embodiments have been described in detail above. The inventor verified the effect of the communication system of the invention through simulation by taking as an example the case where carrier aggregation was performed using five component carriers. The five component carriers each used the same radio resources as those defined in LTE, that is, the radio resources which contained 1200 subcarriers per OFDM symbol and in which RSs were arranged at intervals of six subcarriers. The number of DC (null) subcarriers inserted between each component carrier was chosen to be 19, and no RSs were inserted in the area of the DC subcarriers. In the simulation, the accuracy of propagation channel estimation was computed for two cases: (a) the RSs were arranged on the radio resources so that the RSs were not arranged at intervals of six subcarriers over the entire area of the aggregated component carriers, and (b) the RSs were arranged on the radio resources so that the RSs were arranged at intervals of six subcarriers over the entire area of the aggregated component carriers. In the case of (a), the cell IDs of the five component carriers were (0, 0, 0, 0, 0) respectively, that is, the RS offset of each component carrier was 0. In the case of (b), the cell IDs of the five component carriers were (0, 5, 4, 3, 2) respectively, that is, the RS offsets of the respective component carriers were (0, 5, 4, 3, 2) respectively (see equation (18)).

FIG. 22 illustrates the results of the simulation. In FIG. 22, the abscissa represents the received SNR, and the ordinate represents the normalized MSE (Mean Square Error). The normalized MSE represents the estimation accuracy of the propagation channel estimate, and indicates that the smaller the value, the better the estimation accuracy. From FIG. 22, it can be seen that when the RSs are arranged at equally spaced subcarrier intervals over the entire area of the component carriers (the case (b)), the estimation accuracy improves by 1 to 2 dB over the entire range of the received SNR, compared with the case (a).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A transmitter for performing radio communications with a receiver, based on an orthogonal frequency division multiplexing (OFDM) scheme, by using a plurality of component carriers, each with a prescribed bandwidth in which reference signals known to both the transmitter and the receiver are arranged at constant subcarrier intervals, the transmitter comprising:
a signal generating unit configured to, when performing communications with the receiver by using the plurality of component carriers, generate an OFDM signal in which the reference signals are arranged with predetermined constant subcarrier intervals over the plurality of component carriers and null subcarriers inserted between the plurality of carriers; and
a transmitting unit configured to transmit the OFDM signal to the receiver,
wherein, the plurality of component carriers include, at least, contiguous first component carriers, second component carriers and Null subcarriers inserted between the first and second component carriers, where the first and second component carriers each including predetermined constant number Nc of subcarriers, the Null subcarriers having a length corresponding to predetermined constant number of subcarriers and the reference signals are mapped at intervals of predetermined constant number of subcarriers over the first and second component carriers, in which a position of a reference signal occurring first in the second component carriers is set at the position to which a total number of subcarriers from a reference signal occurring last in the first component carriers becomes an integral multiple of the predetermined constant number associated with the reference signals.

2. The transmitter according to claim 1, wherein the signal generator is configured to generate an OFDM signal in which the reference signals are arranged at the predetermined constant subcarrier intervals not only in consecutive component carriers between which the null subcarriers are inserted but also in subcarriers close to each of adjacent ones of the plurality of component carriers, among a plurality of component carriers provided between adjacent ones of the plurality of component carriers.

3. The transmitter according to claim 1, wherein, the transmitter is operative to prevent an accuracy of propagation channel estimation from degrading at a receiver, by setting the predetermined constant number Nc of subcarriers, predetermined constant number associated with the Null subcarriers and predetermined constant number associated with the reference signals, as defined in claim 1.

4. A receiver for performing radio communications with a transmitter, based on an orthogonal frequency division multiplexing (OFDM) scheme, by using a plurality of component carriers, each with a prescribed bandwidth in which reference signals known to both the transmitter and the receiver are arranged at constant subcarrier intervals, the receiver comprising:
a receiving unit configured to receive an OFDM signal from the transmitter; and
a signal extracting unit configured to, when performing communications with the transmitter by using a plurality of component carriers, extract from the OFDM signal the reference signals that are arranged at predetermined constant subcarrier intervals over the plurality of component carriers and null subcarriers inserted between the plurality of component carriers,
wherein, the plurality of component carriers include, at least, contiguous first component carriers, second component carriers and Null subcarriers inserted between the first and second component carriers, where the first and second component carriers each including predetermined constant number Nc of subcarriers, the Null subcarriers having a length corresponding to predetermined constant number of subcarriers and the reference signals are mapped at intervals of predetermined constant number of subcarriers over the first and second component carriers, in which a position of a reference signal occurring first in the second component carriers is set at the position to which a total number of subcarriers from a reference signal occurring last in the first component carriers becomes an integral multiple of the predetermined constant number associated with the reference signals.

5. The receiver according to claim 4, wherein the receiving unit configured to receive an OFDM signal in which the reference signals are arranged at the predetermined constant subcarrier intervals not only in consecutive component carriers between which the null subcarriers are inserted but also in subcarriers close to each of adjacent ones of the plurality of component carriers, among a plurality of component carriers provided between adjacent ones of the plurality of component carriers.

6. A communication system for performing radio communications between a transmitter and a receiver, based on an orthogonal frequency division multiplexing (OFDM) scheme, by using a plurality of component carriers, each with a prescribed bandwidth in which reference signals known to both the transmitter and the receiver are arranged at predetermined constant subcarrier intervals, wherein the transmitter comprises:
a signal generating unit configured to, when performing communications with the receiver by using a plurality of component carriers, generate an OFDM signal in which the reference signals are arranged with predetermined constant subcarrier intervals over the plurality of component carriers and null subcarriers inserted between the plurality of component carriers; and a transmitting unit configured to transmit the OFDM signal to the receiver, and the receiver comprises:

a receiving unit configured to receive the OFDM signal from the transmitter; and a signal extracting unit configured to extract, when performing communications with the transmitter by using a plurality of component carriers, the reference signals from the OFDM signal received by the receiving unit that are arranged at the predetermined constant subcarrier intervals over the component carriers and the null subcarriers inserted between the component carriers, wherein, the plurality of component carriers include, at least, contiguous first component carriers, second component carriers and Null subcarriers inserted between the first and second component carriers, where the first and second component carriers each including predetermined constant number Nc of subcarriers, the Null subcarriers having a length corresponding to predetermined constant number of subcarriers and the reference signals are mapped at intervals of predetermined constant number of subcarriers over the first and second component carriers, in which a position of a reference signal occurring first in the second component carriers is set at the position to which a total number of subcarriers from a reference signal occurring last in the first component carriers becomes an integral multiple of the predetermined constant number associated with the reference signals.

7. The communication system according to claim 6, wherein the signal generator in the transmitter is configured to generate an OFDM signal in which the reference signals are arranged at the predetermined constant subcarrier intervals not only in consecutive component carriers between which the null subcarriers are inserted but also in subcarriers close to each of adjacent ones of the plurality of component carriers, among a plurality of component carriers provided between adjacent ones of the plurality of component carriers.

8. A communication method for use in a communication system that performs radio communications between a transmitter and a receiver, based on an orthogonal frequency division multiplexing (OFDM) scheme, by using a plurality of component carriers, each with a prescribed bandwidth in which reference signals known to both the transmitter and the receiver are arranged at constant subcarrier intervals, the method comprising:

the transmitter, when performing communications with the receiver by using a plurality of component carriers, transmitting to the receiver an OFDM signal in which the reference signals are arranged with predetermined constant subcarrier intervals over the plurality of component carriers and null subcarriers inserted between the plurality of component carriers; and the receiver extracting the reference signals from the OFDM signal received from the transmitter, wherein, the plurality of component carriers include, at least, contiguous first component carriers, second component carriers and Null subcarriers inserted between the first and second component carriers, where the first and second component carriers each including predetermined constant number Nc of subcarriers, the Null subcarriers having a length corresponding to predetermined constant number of subcarriers and the reference signals are mapped at intervals of predetermined constant number of subcarriers over the first and second component carriers, in which a position of a reference signal occurring first in the second component carriers is set at the position to which a total number of subcarriers from a reference signal occurring last in the first component carriers becomes an integral multiple of the predetermined constant number associated with the reference signals.

9. The communication method according to claim 8, wherein the method includes the transmitter generating an OFDM signal in which the reference signals are arranged at the predetermined constant subcarrier intervals not only in consecutive component carriers between which the null subcarriers are inserted but also in subcarriers close to each of adjacent ones of the plurality of component carriers, among a plurality of component carriers provided between adjacent ones of the plurality of component carriers.

* * * * *